(12) United States Patent
Kudo

(10) Patent No.: US 11,025,813 B2
(45) Date of Patent: Jun. 1, 2021

(54) CONTROL APPARATUS, IMAGE PICKUP APPARATUS, CONTROL METHOD AND MEMORY MEDIUM

(71) Applicant: CANON KABUSHIKI KAISHA, Tokyo (JP)

(72) Inventor: Keisuke Kudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/067,440

(22) Filed: Oct. 9, 2020

(65) Prior Publication Data

US 2021/0127066 A1 Apr. 29, 2021

(30) Foreign Application Priority Data

Oct. 24, 2019 (JP) .............................. JP2019-193630

(51) Int. Cl.
*H04N 5/232* (2006.01)

(52) U.S. Cl.
CPC ... *H04N 5/232121* (2018.08); *H04N 5/23251* (2013.01); *H04N 5/23299* (2018.08); *H04N 5/232127* (2018.08)

(58) Field of Classification Search
CPC .......... H04N 5/232127; H04N 5/3656; H04N 5/23216; H04N 5/23219; H04N 5/23222; H04N 5/23245; H04N 5/232121; H04N 5/23299; H04N 5/23251; G06T 7/571; G06T 7/20
USPC ........................................................ 348/345
See application file for complete search history.

(56) References Cited

U.S. PATENT DOCUMENTS

| | | | |
|---|---|---|---|
| 10,326,925 B2* | 6/2019 | Kawanishi | H04N 5/232122 |
| 10,623,623 B2* | 4/2020 | Hongu | G02B 7/34 |
| 10,863,079 B2* | 12/2020 | Takehara | H04N 5/232127 |
| 2013/0329118 A1* | 12/2013 | Hongu | H04N 5/23212 |
| | | | 348/345 |
| 2015/0316833 A1* | 11/2015 | Watanabe | G03B 13/36 |
| | | | 348/345 |
| 2016/0105600 A1* | 4/2016 | Omata | H04N 5/232122 |
| | | | 348/140 |
| 2016/0227101 A1* | 8/2016 | Iwasaki | H04N 5/3575 |
| 2017/0223261 A1* | 8/2017 | Shimizu | H04N 5/23212 |
| 2017/0228887 A1* | 8/2017 | Sekimoto | G06F 3/00 |
| 2018/0048805 A1* | 2/2018 | Kawanishi | H04N 5/232122 |
| 2018/0063415 A1* | 3/2018 | Hongu | H04N 5/23212 |
| 2019/0011805 A1* | 1/2019 | Ota | H04N 5/23293 |
| 2019/0020826 A1* | 1/2019 | Takehara | G06T 7/20 |

FOREIGN PATENT DOCUMENTS

JP 2019020716 A 2/2019

* cited by examiner

*Primary Examiner* — Pritham D Prabhakher
(74) *Attorney, Agent, or Firm* — Canon U.S.A., Inc. IP Division

(57) ABSTRACT

A control apparatus includes a focus detecting unit configured to detect a defocus amount, a continuity determining unit configured to determine a continuity of a focus detection result, a characteristic detecting unit configured to detect characteristics of a main object and of surroundings of the main object, a controlling unit configured to change a parameter relating to a tracking operation based on the characteristics during the tracking operation and a focus adjusting unit configured to perform a focus adjustment based on the defocus amount, the continuity of the focus detection result and the parameter.

19 Claims, 15 Drawing Sheets

STATE WHERE OBJECT A701 (MAIN OBJECT) EXISTS IN FOCUS DETECTION AREA

STATE WHERE OBJECT B702 (BACKGROUND OBJECT) EXISTS IN FOCUS DETECTION AREA

STATE WHERE OBJECT A701 (MAIN OBJECT) RECOVERS TO FOCUS DETECTION AREA

STATE WHERE OBJECT A1001 (MAIN OBJECT) EXISTS IN FOCUS DETECTION AREA

STATE WHERE OBJECT C1002 (OBSTRUCTION) EXISTS IN FOCUS DETECTION AREA

STATE WHERE OBJECT A1001 (MAIN OBJECT) EXISTS IN FOCUS DETECTION AREA

CONTROL APPARATUS, IMAGE PICKUP APPARATUS, CONTROL METHOD AND MEMORY MEDIUM

BACKGROUND OF THE INVENTION

Field of the Invention

The present invention relates to an image pickup apparatus that adjust a focus on an object.

Description of the Related Art

Conventionally, a camera is known that is equipped with an image pickup mode in which an optimum image pickup operation is collectively set according to an image pickup environment, automatically. This type of camera includes a sports mode suitable for capturing a moving object, a portrait image pickup mode suitable for capturing people, a landscape image pickup mode suitable for capturing a landscape, a night view image pickup mode suitable for capturing a night view, and the like. When a user selects an image pickup mode suitable for the image pickup environment, various set values are collectively set automatically, the set values being such as a shutter speed value, aperture value (F-number), and exposure correction value. By using a camera equipped with such an image pickup mode, the user can set various set values according to the image pickup environment without a specialized knowledge.

However, for the image pickup environments selectable in an image pickup mode, various set values are used such that the image pickup operation is generally suitable. Hence, when more specific image pickup is performed using the selected image pickup mode, an optimum image pickup operation may not always be acquired. In particular, in an image pickup mode suitable for capturing a moving object, the object may move in motion such as a monotonously approaching motion, sudden movement and stop, motion of greatly moving up, down, left, and right, and the like. In other words, if there is no image pickup mode suitable for the image pickup environment, it is impossible to realize an optimum image pickup operation according to the motion of various objects.

Japanese Patent Laid-Open No. ("JP") 2019-20716 discloses an image pickup apparatus that can properly keep tracking an object during a tracking operation by changing a set value of a set item relating to the tracking operation according to motion of the object and motion of the image pickup apparatus.

However, in the image pickup apparatus disclosed in JP 2019-20716, when a variation occurs in the image pickup environment other than the motion of the object or the motion of the image pickup apparatus, it may be impossible to properly set the set item relating to the tracking operation and to track the object. For example, when an obstruction exists in front of the object, the obstruction may be accidentally focused on, and the object may be out of focus. For example, when a state changes from where the object is in focus to where part other than the object such as background is in focus, it may take some time to refocus the object even if the object is framed again.

SUMMARY OF THE INVENTION

The present invention provides a control apparatus, an image pickup apparatus, a control method, and a memory medium each of which can properly keep tracking an object during a tracking operation.

A control apparatus according to one aspect of the present invention includes a focus detecting unit configured to detect a defocus amount, a continuity determining unit configured to determine a continuity of a focus detection result, a characteristic detecting unit configured to detect characteristics of a main object and of surroundings of the main object, a controlling unit configured to change a parameter relating to a tracking operation based on the characteristics during the tracking operation and a focus adjusting unit configured to perform a focus adjustment based on the defocus amount, the continuity of the focus detection result and the parameter.

An image pickup apparatus including the above control apparatus, a control method corresponding the control apparatus, and a storage medium storing a computer program that enables a computer to execute the control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
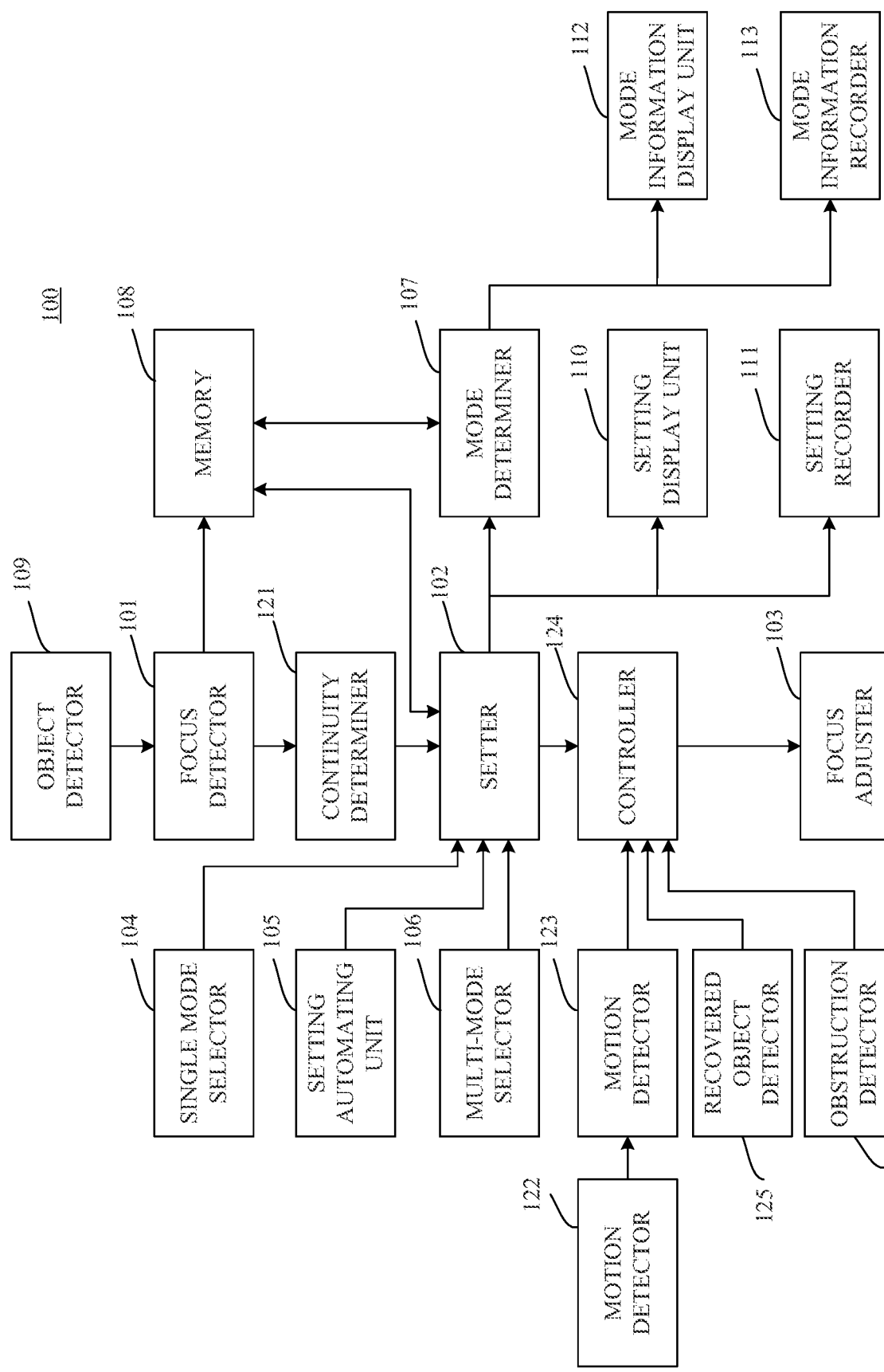
FIG. 1 is a block diagram illustrating a focus adjustment apparatus according to a first embodiment.

First, a description will be given of a focus adjustment apparatus according to the first embodiment with reference to FIG. 1. FIG. 1 is a block diagram illustrating a focus adjustment apparatus 100 as a control apparatus. Each unit in FIG. 1 is realized by a cooperation of a hardware and a software of an image pickup apparatus 200 illustrated in FIG. 2 under control of a microcomputer 221 described later with reference to FIG. 2. That is, in this embodiment, the focus adjustment apparatus 100 may form part of the image pickup apparatus 200, and the microcomputer 221 may be configured to realize at least part of functions of the focus adjustment apparatus 100.

In FIG. 1, a focus detector 101 as a focus detecting unit is configured to detect a focus detection result of a plurality of coordinates on an image pickup screen. The focus detection result is detected as an image plane position of an object based on an image-forming position and a defocus amount as a focusing state of an image pickup lens 201. A continuity determiner 121 as a continuity determining unit is configured to determine a continuity of the image plane position of the object, that is, a continuity of the focus detection result, based on a time-series variation of the focus detection result detected by the focus detector 101.

Figure 5:
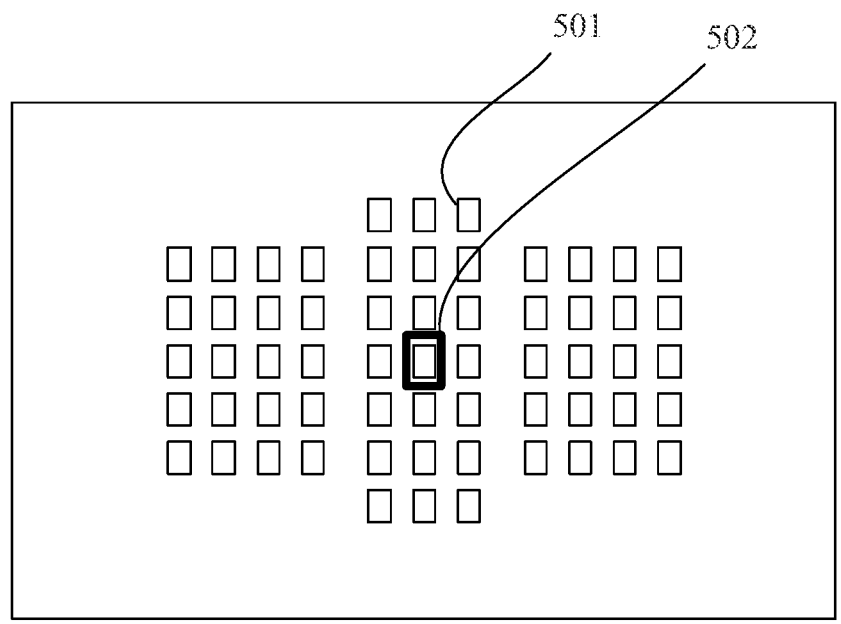
FIG. 5 is an explanatory diagram illustrating a focus detection area according to the first embodiment.

FIG. 5 is a diagram illustrating an example of a plurality of focus detection areas 501, that is, a plurality of distance measurement points, of the focus detector 101. The defocus amount is detected based on an image shift amount of two images in a line sensor (not illustrated) disposed on the focus detection area 501 that is indicated by a square in FIG. 5. The defocus amount detected in each focus detection area is temporarily stored on a memory 219 together with its detection time. The microcomputer 221 is configured to acquire the image plane position which is a position of the image pickup lens 201 and in which the object is in focus, based on the defocus amount and a current position of the image pickup lens 201. Thereafter, the microcomputer 221 stores the acquired image plane position on the memory 219 together with the detection time.

The microcomputer 221 is configured to store a defocus amount and an image plane position of a focus detection area 502 on the memory 219 together with the detection time. The focus detection area 502 is selected from the plurality of focus detection areas 501 as distance measurement points. The position of the focus detection area to be selected may be arbitrarily set by the user, or the position of the object detected by the object detector 109 may be selected. Alternatively, the focus detection area may be selected in which the defocus amount is detected of the image plane position closest to the camera. It is not necessary to select one detection area, and it may be possible to select a plurality of detection areas and to store the average value of the image plane positions on the memory 219 together with the detection time.

A motion detector 122 is configured to detect a motion detection result, that is a direction and a size of motion, of the image pickup apparatus or of the image pickup lens. The motion detection result is detected as an angular velocity. A motion detector 123 as a motion detecting unit is configured to determine whether or not the image pickup apparatus or the image pickup lens is moving, based on the motion detection result detected by the motion detector 122. A controller 124 as a controlling unit is configured to control a focus adjuster 103 as a focus adjusting unit based on the determination result of the continuity of the image plane position of the object acquired by the continuity determiner 121 and the determination result of the presence or absence of the motion of the image pickup apparatus or of the image pickup lens acquired by the motion detector 123. The focus adjuster 103 is configured to adjust the focus based on an instruction from the controller 124.

A recovered object detector 125 as a recovered object detecting unit is configured to detect that a main object recovers to a position detectable by the focus detector 101. An obstruction detector 126 as an obstruction detecting unit is configured to detect an obstruction existing around the main object. In this embodiment, the recovered object detector 125 and the obstruction detector 126 are characteristic detecting units configured to detect characteristics of the main object and of surroundings of the main object.

A setter 102 as the controlling unit is configured to set set values of a plurality of set items (a plurality of items) relating to a tracking operation. A focus adjuster 103 as a focus adjusting unit is configured to perform a focus adjustment operation based on the set values of a plurality of set items relating to the tracking operation set by the setter 102. A single mode selector 104 as the controlling unit is configured to select either an automatic mode that automatically sets the set values of the plurality of set items relating to the tracking operation or a manual mode that manually sets set values (fixed value) of the plurality of set items. When the single mode selector 104 selects the manual mode, the setter 102 may set a predetermined set value corresponding to the manual mode as each of the set values of the plurality of set items relating to the tracking operation. On the other hand, when the single mode selector 104 selects the automatic mode, the setter 102 may automatically set the set values of the plurality of set items relating to the tracking operation.

A setting automating unit 105 as the controlling unit is configured to control the setter 102 so as to automatically set at least one of the set values of the plurality of set items relating to the tracking operation. At this time, the setter 102 can automatically set the set values of at least one of the plurality of set items relating to the tracking operation.

A multi-mode selector 106 is configured to select M ($2 \leq M \leq N$) operation modes from N ($2 \leq N$) operation modes that fix the set values of the plurality of set items relating to the tracking operation to predetermined set values. A mode determiner 107 is configured to determine one operation mode from the M operation modes selected by the multi-mode selector 106 based on the set values of the plurality of set items relating to the tracking operation automatically set by the setter 102. That is, the mode determiner 107 determines one operation mode corresponding to set values that matches the set values automatically set by the setter 102. At this time, the setter 102 can set the predetermined set values corresponding to the operation mode determined by the mode determiner 107, as the set values of the plurality of set items relating to the tracking operation.

A memory 108 is configured to store the detection time of the defocus amount detected by the focus detector 101 and the image plane position calculated from the defocus amount over a past plurality of times. The memory 108 is also configured to store the set values of the plurality of set items relating to the tracking operation set by the setter 102 and mode information relating to the operation mode determined by the mode determiner 107 over the past plurality of times. An object detector 109 is configured to detect a coordinate position of the object on a screen based on luminance information. A setting display unit 110 is configured to display the set values of the plurality of set items relating to the tracking operation set by the setter 102 on a finder screen and on a liquid crystal monitor screen. A setting recorder 111 is configured to record the set values of the plurality of set items relating to the tracking operation set by the setter 102 on a captured image. A mode information display unit 112 is configured to display mode information relating to the operation mode determined by the mode determiner 107 on the finder screen and on the liquid crystal monitor screen. A mode information recorder 113 is configured to record the mode information relating to the operation mode determined by the mode determiner 107 on the captured image.

Figure 2:
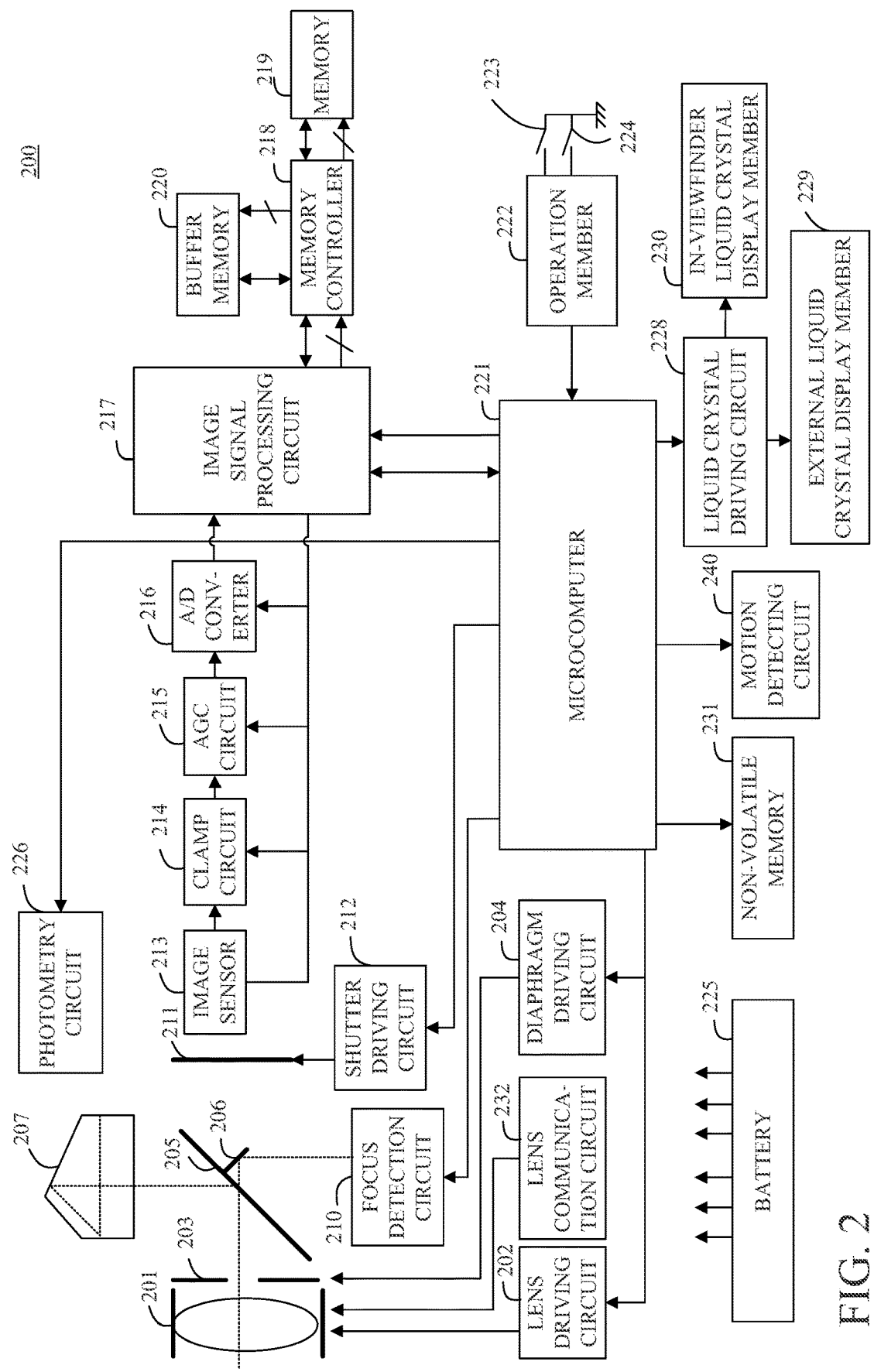
FIG. 2 is a block diagram illustrating an image pickup apparatus according to the first embodiment.

Next, a description will be given of the image pickup apparatus according to this embodiment with reference to FIG. 2. FIG. 2 is a block diagram illustrating the image pickup apparatus 200 that is a single-lens reflex digital camera. In this embodiment, the image pickup apparatus 200 is configured to include a camera body having an image sensor 213 and an interchangeable lens as a lens apparatus detachably attached to the camera body. However, this embodiment is not limited to this, and is also applicable to an image pickup apparatus in which a camera body and a lens apparatus are integrally configured.

In FIG. 2, a lens driving circuit 202 is configured to include, for example, a DC motor or an ultrasonic motor, and to perform focusing by changing a focus lens position of an image pickup lens 201 as an image pickup optical system under the control of the microcomputer 221. A diaphragm driving circuit 204 is configured to drive a diaphragm 203 with a driving amount calculated by the microcomputer 221, and to change an optical aperture value (F-number).

A lens communication circuit 232 is configured to communicate with a built-in microcomputer (not illustrated) inside the image pickup lens 201. This communication is controlled by the microcomputer 221. The microcomputer 221 is configured to acquire a state of the image pickup lens 201 via the lens communication circuit 232.

A main mirror 205 is configured to switch a path of a light beam entering from the image pickup lens 201, between a finder side and an image sensor side. The main mirror 205 is basically disposed so as to guide the light beam toward the finder side, but during the image pickup, the main mirror 205 jumps upward and retreats from the light beam so that the light beam is guided to the image sensor 213. Part of the light beam reflected by the main mirror 205 is guided to a photometry circuit 226 including an AE sensor for a photometry, and luminance information and the like are detected. The main mirror 205 is a half mirror so that a central portion thereof can transmit part of the light, and is configured to transmit the light beam so that part of the light beam enters a pair of AF sensors for a focus detection.

A sub mirror 206 is configured to reflect the light beam transmitted from the main mirror 205 and to guide the light beam to a focus detection circuit 210 that includes the AF sensor for the focus detection. The focus detection circuit 210 can perform the focus detection by, for example, a phase difference method, and in this embodiment, includes the pair of AF sensors. The light beam is transmitted through the central portion of the main mirror 205, is reflected by the sub mirror 206 and reaches the pair of AF sensors for a photoelectric conversion, the pair of AF sensors being disposed inside the focus detection circuit 210. Outputs from the pair of AF sensors are used to calculate the defocus amount indicating a focus adjustment state of the image pickup lens for the object. This embodiment independently configures the photometry circuit 226 and the focus detection circuit 210, but the image sensor 213 and an image signal processing circuit 217 may have a photometry function and a focus detection function. The finder includes a pentaprism 207, a focusing plate 208, an eyepiece 209 and the like. The microcomputer 221 is configured to evaluate a calculation result and to instruct the lens driving circuit 202 to drive the focus lens.

A motion detecting circuit 240 includes a detector configured to detect motion of the image pickup apparatus 200. The detector is, for example, an angular acceleration sensor, and is configured to detect an acceleration while assuming that a rotation axis is a horizontal axis or a vertical axis of the image pickup apparatus 200.

The shutter driving circuit 212 is configured to drive a focal plane shutter 211 under the control of the microcomputer 221. The microcomputer 221 is configured to control an opening time of the focal plane shutter. The image sensor 213 includes a CCD sensor, a CMOS sensor and the like, and is configured to photoelectrically convert an object image, that is an optical image, formed via the image pickup lens 201 and to output an image signal. A clamp circuit 214 and an AGC circuit 215 are configured to perform basic analog signal processing before an A/D conversion. The clamp circuit 214 and the AGC circuit 215 are respectively configured to change a clamp level and an AGC reference level under the control of the microcomputer 221. An A/D converter 216 is configured to convert an analog image signal output from the image sensor 213 into a digital image signal.

The image signal processing circuit 217 is realized by a logic device such as a gate array. The image signal processing circuit 217 is configured to perform filter processing, color conversion processing and gamma processing on the digitized image data, to perform compression processing such as JPEG and to output a result to a memory controller 218. The memory controller 218 is configured to control storage and retrieval of data on the memory 219 and on a buffer memory 220. The image signal processing circuit 217 can output exposure information and information on white balance and the like of the signal from the image sensor 213 to the microcomputer 221, if necessary. The microcomputer 221 is configured to transmit an instruction on a white balance and a gain adjustment based on the information. During a continuous image pickup operation, the image signal processing circuit 217 is configured to temporarily store captured data on the buffer memory 220 as an unprocessed image, to read the unprocessed image data through the memory controller 218, and to perform image processing and compression processing. The number of continuously captured images depends on a size of the buffer memory 220.

The memory controller 218 is configured to store unprocessed digital image data input from the image signal processing circuit 217 on the buffer memory 220, and to store processed digital image data on the memory 219. The memory controller 218 is configured to output the image data from the buffer memory 220 or the memory 219 to the image signal processing circuit 217. The memory 219 may be configured detachably attachable. An operation member 222 is configured to transmit its state to the microcomputer 221. The microcomputer 221 is configured to control each unit according to a state change of the operation member 222.

A reference numeral 223 denotes a first switch, that is also referred to as a switch SW1, and a reference numeral 224 denotes a second switch, that is also referred to as a switch SW2. Each of the switches SW1 and SW2 is a switch turned on and off by operating a release button, and is one of the input switches of the operation member 222. When only the switch SW1 is on, the release button is half pressed. In this state, the focus adjustment operation and the photometry operation are performed. When both the switch SW1 and the switch SW2 are on, the release button is fully pressed and the image pickup operation is performed in this state. When both the switch SW1 and the switch SW2 are kept on, the continuous image pickup operation is performed. The operation member 222 is also connected to non-illustrated switches such as an ISO setting button, an image size setting button, an image quality setting button and an information display button, and a state of each switch is detected. A battery 225 is configured to supply necessary power to each IC and a driving system. A display member 227 includes a liquid crystal monitor and the like, and is configured to output a state of the microcomputer 221 to outside.

A liquid crystal driving circuit 228 is configured to drive an external liquid crystal display member 229 and an in-viewfinder liquid crystal display member 230 according to a display content command of the microcomputer 221. A backlight such as an LED (not illustrated) is disposed on the in-viewfinder liquid crystal display member 230, and the LED is also driven by the liquid crystal driving circuit 228. The microcomputer 221 is configured to confirm a capacity of the memory 219 via the memory controller 218 and to calculate the remaining number of capturable images based on predicted value data on an image size according to an ISO sensitivity, an image size or an image quality each of which are set before the image pickup. The microcomputer 221 may display a calculation result on the external liquid crystal display member 229 or the in-viewfinder liquid crystal display member 230 if necessary. A non-volatile memory 231 (EEPROM) can store data even when the image pickup apparatus 200*a* is not powered on.

In the image pickup apparatus 200, this embodiment sets a predetermined set value corresponding to the manual mode when the user selects the manual mode that fixes the set values of the plurality of set items relating to the focus adjustment operation to the predetermined values. On the other hand, when the user selects the automatic mode, all the set items relating to the tracking operation are automatically set. Thereby, it is possible to automatically set the plurality of set items relating to the tracking operation according to the motion of the object that changes moment by moment, and to keep tracking the object.

Figure 13A:
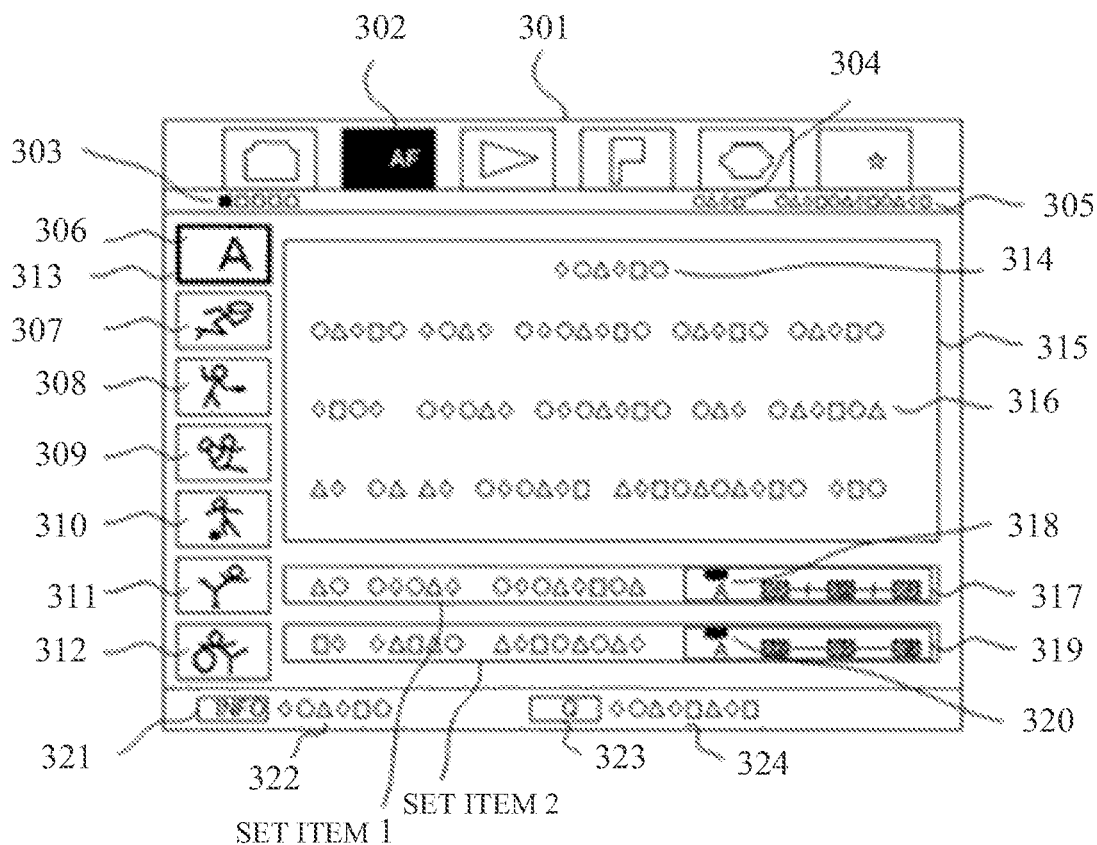
FIGS. 13A and 13B are explanatory diagrams illustrating an operation mode selection according to the first embodiment.

Next, a description will be given of an operation mode selection in this embodiment with reference to FIGS. 13A and 13B. FIG. 13A is an explanatory diagram illustrating an automatic mode which automatically performs setting relating to tracking operation on the menu screen. A large tab 301 is a tab display for classifying large items in a menu. The large tabs include an "image pickup" tab, an "AF" tab, a "playback" tab, a "setting" tab, a "custom function" tab and a "my menu" tab. An icon representing a function is displayed on each tab. A tab with a black background displayed is indicated to be selected. In FIG. 13A, the "AF" tab is selected.

The "AF" tab of the large tab is further divided into a plurality of AF setting small tabs 303, and a content of one small tab can be displayed on one screen. Square marks are displayed according to the number of the small tabs 303. The selected small tab is displayed as a black square. A reference numeral 304 denotes a small tab name display that displays a name of the selected small tab 303, and a simple guide for the small tab 303 is displayed next to the name. The small tab guide 305 may be omitted.

Reference numerals 306 to 312 denote operation mode icons of an operation mode 0 to an operation mode 6, respectively. The operation mode 0 is an automatic mode and the operation modes 1 to 6 are manual modes. A focus display 313 is displayed for a currently selected operation mode. The operation mode name display 314 displays a name of the selected operation mode, and the operation mode description display 316 in the operation mode guidance area 315 displays the description of the selected operation mode. In a set item 1 set area 317, a set item 1 set value display 318 displays a set value of a set item 1 by a cursor. In a set item 2 set area 319, a set item 2 set value display 320 displays a set value of a set item 2 by a cursor.

Since the operation mode 1 is an automatic mode, the cursor is displayed at "A" representing an automatic setting, and the other set values are grayed out and cannot be selected. An operation member icon 1 denoted by the reference numeral 321 is displayed in lower part in the area of the menu screen, and its description is displayed in an operation member guidance 1 denoted by the reference numeral 322. The operation member icon 2 denoted by the reference numeral 323 is displayed, and a description thereof is displayed in an operation member guidance 2 denoted by the reference numeral 324. The operation member 222 can be made to perform the settings displayed on the operation member guidance by an operation of a button (not illustrated).

Figure 13B:
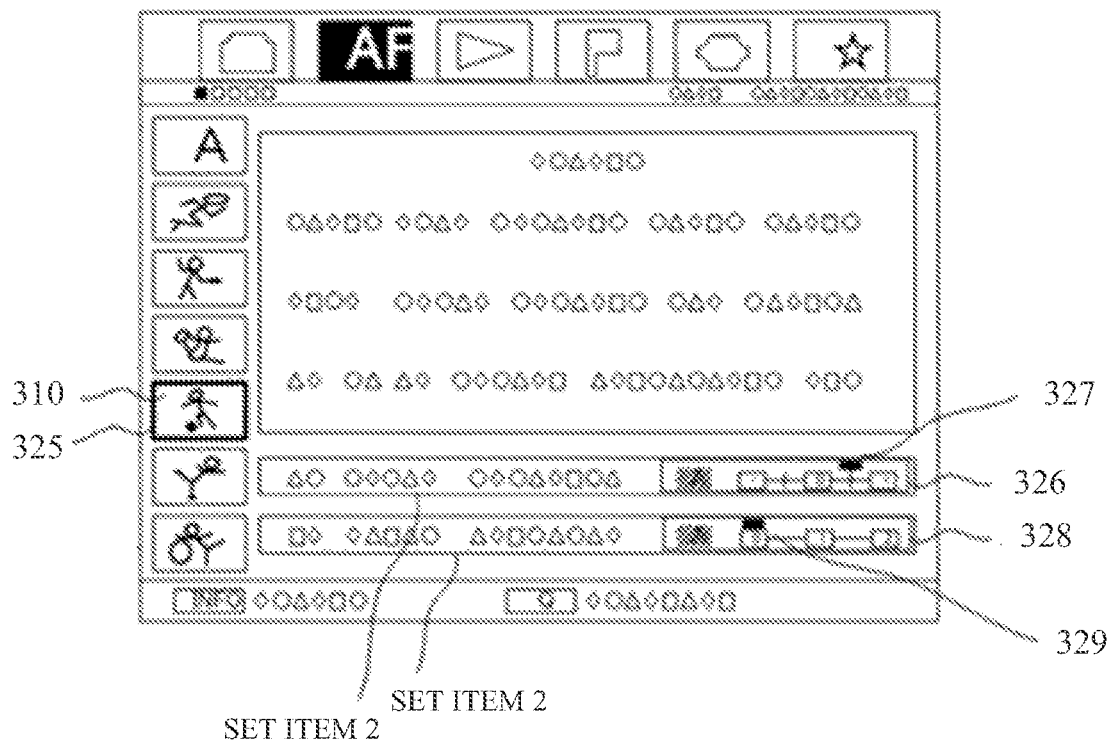

FIG. 13B is an explanatory diagram of the manual mode in which the plurality of set items relating to the tracking operation are fixed to the predetermined values. An operation mode 4, which is the manual mode, is selected and a focus display 325 is displayed. In a set item 1 set area 326, a set item 1 set value display 327 displays a set value of set item 1 by a cursor. In a set item 2 set area 328, a set item 2 set value display 329 displays a set value of set item 2 by a cursor. In a case of the manual mode, each of the set values of the set item 1 and set item 2 is set to a predetermined value corresponding to each operation mode as an initial value. As the initial value, the cursors are displayed at +1 for the set value of the set item 1 and at 0 for the set value of the set item 2. Each set value of each set item is variable to an arbitrary value. Since the operation mode 4 is a manual mode, "A" representing automatic setting in the set item 1 set area 326 and in the set item 2 set area 328 is grayed out and cannot be selected.

Figure 3:
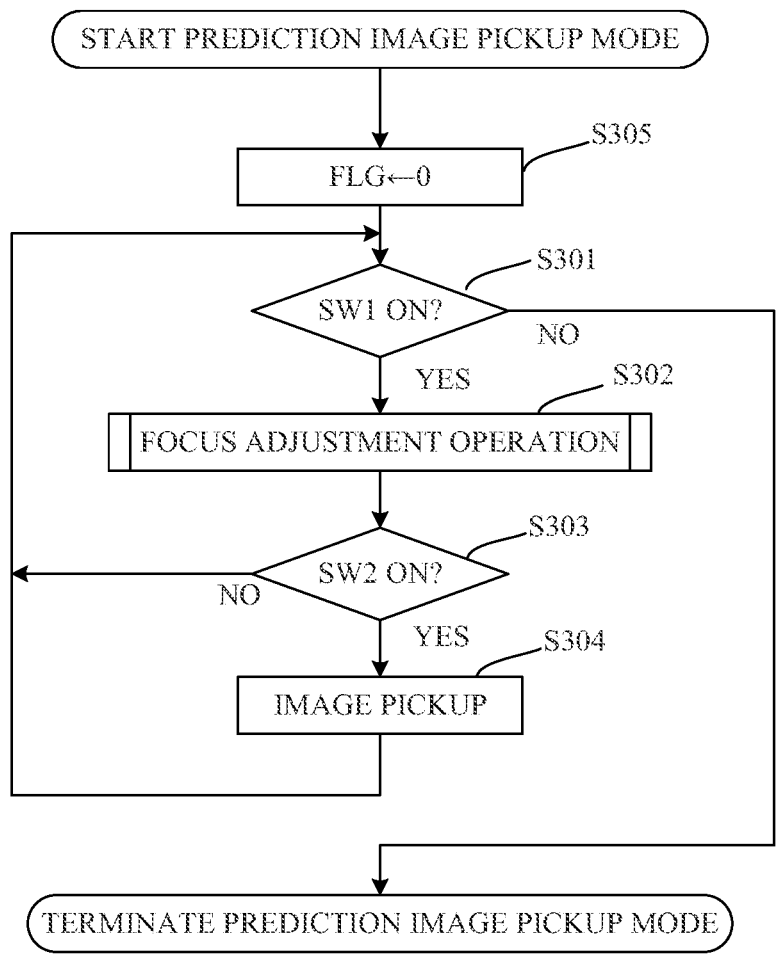
FIG. 3 is a flowchart illustrating image pickup processing according to the first embodiment.

Next, a description will be given of the image pickup processing in this embodiment with reference to FIG. 3. FIG. 3 is a flowchart illustrating the image pickup processing in this embodiment. Each step in FIG. 3 is mainly executed by the microcomputer 221. The image pickup apparatus 200 includes two types of modes one of which is a mode of driving the lens according to the image plane of the object at a certain time, that is also referred to as a one-shot image pickup mode, and the other of which is a mode of driving the lens while predicting the image plane of object at a time later than the current time, that is also referred to as a prediction image pickup mode. This embodiment describes an operation when the image pickup apparatus 200 is set to the prediction image pickup mode.

First, in step S305, the microcomputer 221 substitutes 0 for a flag FLG. The flag FLG is information indicating whether or not a driving standby timer, which will be described later, is driving. Subsequently, in step S301, the microcomputer 221 determines the state of the switch SW1. When the switch SW1 is on, the process proceeds to step S302. On the other hand, when the switch SW1 is off, the microcomputer 221 terminates the prediction image pickup mode.

In step S302, the microcomputer 221 performs focus adjustment processing, that is, a focus adjustment operation. The details will be described later of the focus adjustment processing with reference to FIG. 4. Subsequently, in step S303, the microcomputer 221 determines the state of the switch SW2. When the switch SW2 is off, the process returns to step S301. On the other hand, when the switch SW2 is on, the process proceeds to step S304. In step S304, the microcomputer 221 raises the main mirror 205 and operates the focal plane shutter 211 to perform the image pickup. Thereafter, the process returns to step S301.

Figure 4:
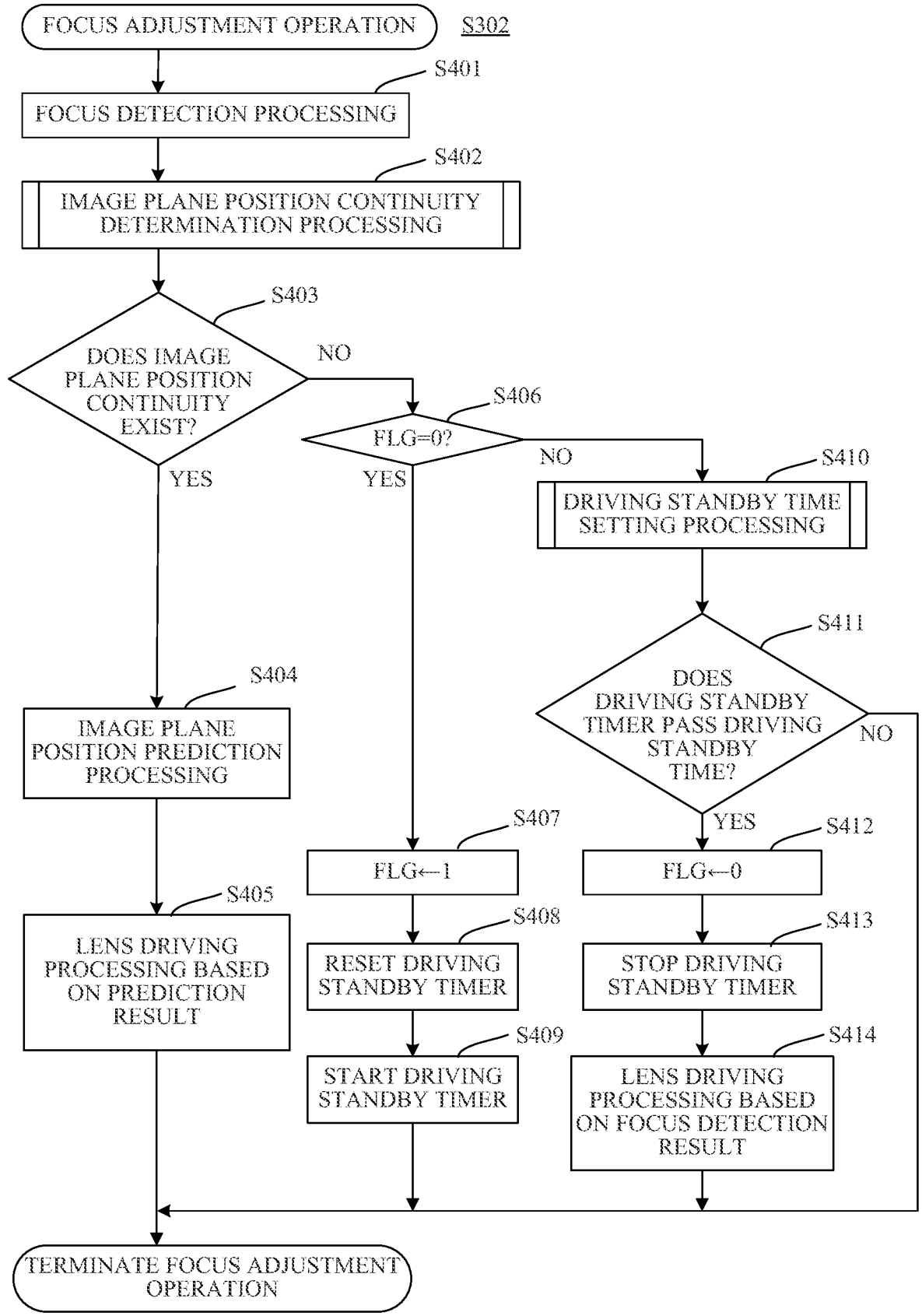
FIG. 4 is a flowchart illustrating a focus adjustment operation according to the first embodiment.

Next, a description will be given of the focus adjustment operation performed in step S302 in this embodiment with reference to FIG. 4. FIG. 4 is a flowchart illustrating the focus adjustment operation in this embodiment. Each step in FIG. 4 is mainly executed by the focus detector 101 or the microcomputer 221. This embodiment will describe a method of automatically changing a set value of a set item "object tracking characteristic".

The "object tracking characteristic" is a set item indicating a length of a driving inhibition time for the focus lens of the image pickup lens when it is determined that objects are not the same object based on the focus detection result. When an obstruction which the user does not intend appears frequently and obstructs the object, or when it is difficult for the user to capture the object such as an object with large motion on the screen, the driving inhibition time may be set longer. On the other hand, when the user wants to switch a tracking target from one object to another object, the driving inhibition time may be set shorter. When the obstruction frequently appears and obstructs the object, if the driving inhibition time is shortened, the tracking target may switch to an unintended object. When the user wants to switch the tracking target from one object to another object, if the driving inhibition time is lengthened, the tracking target does not switch to the object targeted by the user, and the user may miss image pickup at expected timing. Thus, the "object tracking characteristic" may be properly set depending on an image pickup situation and an intention of the user.

First, in step S401, the focus detector 101 detects the defocus amount using the focus detection circuit 210. This embodiment performs the subsequent processing using the image plane position acquired in the focus detection area 502 as a focus detection area arbitrary set and selected by the user.

Subsequently, in step S402, the microcomputer 221 performs image plane position continuity determination processing, the image plain being a focus position where a focus detection is performed. That is, the microcomputer 221 determines whether a continuity exists of the currently detected image plane position based on the past plurality of image plane positions stored on the memory 219 in step S401. The microcomputer 221 calculates a regression curve for the past plurality of image plane positions by, for example, a least square method. When a difference is within the threshold value between a current predicted image plane position predicted from the regression curve and the current image plane position detected in step S401, the microcomputer 221 determines that the continuity exists of the focus position. On the other hand, when the difference exceeds the threshold value between the predicted image plane position and the current image plane position, the microcomputer 221 determines that the continuity of the focus position does not exist. When no continuity exists of the focus position, the microcomputer 221 provides a control so as not to use the current image plane position and its detection time during focus position prediction processing in step S404 and next focus position continuity determination processing.

Subsequently, in step S403, the microcomputer 221 evaluates the result of the focus position continuity determination processing in step S402. When it is determined in step S402 that the continuity exists of the current image plane position, the process proceeds to step S404. On the other hand, when it is determined that the continuity does not exist of the current image plane position, the process proceeds to step S406.

In step S404, the microcomputer 221 performs the focus position prediction processing. That is, the microcomputer 221 predicts a future image plane position based on the past plurality of image plane positions and the current image plane position stored on the memory 219 in step S401. The microcomputer 221 acquires a regression curve by, for example, a least square method as described in step S402, and predicts the future image plane position.

Subsequently, in step S405, the microcomputer 221 drives the lens based on a focus position prediction result. Since the future image plane position is acquired in step S404, the microcomputer 221 performs communication via the lens communication circuit 232 to drive the focus lens based on the result.

In step S406, the microcomputer 221 evaluates the value of the flag FLG. When the flag FLG is 0, the process proceeds to step S407. On the other hand, when the flag FLG is 1, the process proceeds to step S410. In step S407, the microcomputer 221 substitutes 1 for the flag FLG. Subsequently, in step S408, the microcomputer 221 resets the driving standby timer. Subsequently, in step S409, the microcomputer 221 starts time measurement by using the driving standby timer.

In step S410, the microcomputer 221 performs driving standby time setting processing. The details will be described later of the driving standby time setting processing. Subsequently, in step S411, the microcomputer 221 determines whether or not a time measurement result from the driving standby timer has passed the driving standby time set in step S410. When the time measurement result of the driving standby timer exceeds the predetermined time, the process proceeds to step S412. On the other hand, when the time measurement result of the driving standby timer has not passed the driving standby time, the focus adjustment process is terminated.

In step S412, the microcomputer 221 substitutes 0 for the flag FLG. Subsequently, in step S413, the microcomputer 221 stops the time measurement by the driving standby timer. Subsequently, in step S414, the microcomputer 221 drives the lens based on the image plane position currently detected in step S401. The microcomputer 221 communicates via the lens communication circuit 232 to drive the focus lens.

In this flow, the flag FLG is information indicating whether or not the driving standby timer is measuring time. When the driving standby timer is measuring time and the driving standby time (hereinafter also referred to as a predetermined time) has not elapsed, the microcomputer 221 determines that the object is not properly tracked and does not perform lens driving processing. On the other hand, when the driving standby timer is measuring time and the predetermined time has elapsed, the microcomputer 221 determines that a new object is targeted, and performs the lens driving processing based on the current image plane position.

[Driving Standby Time Setting Processing]

Figure 6:
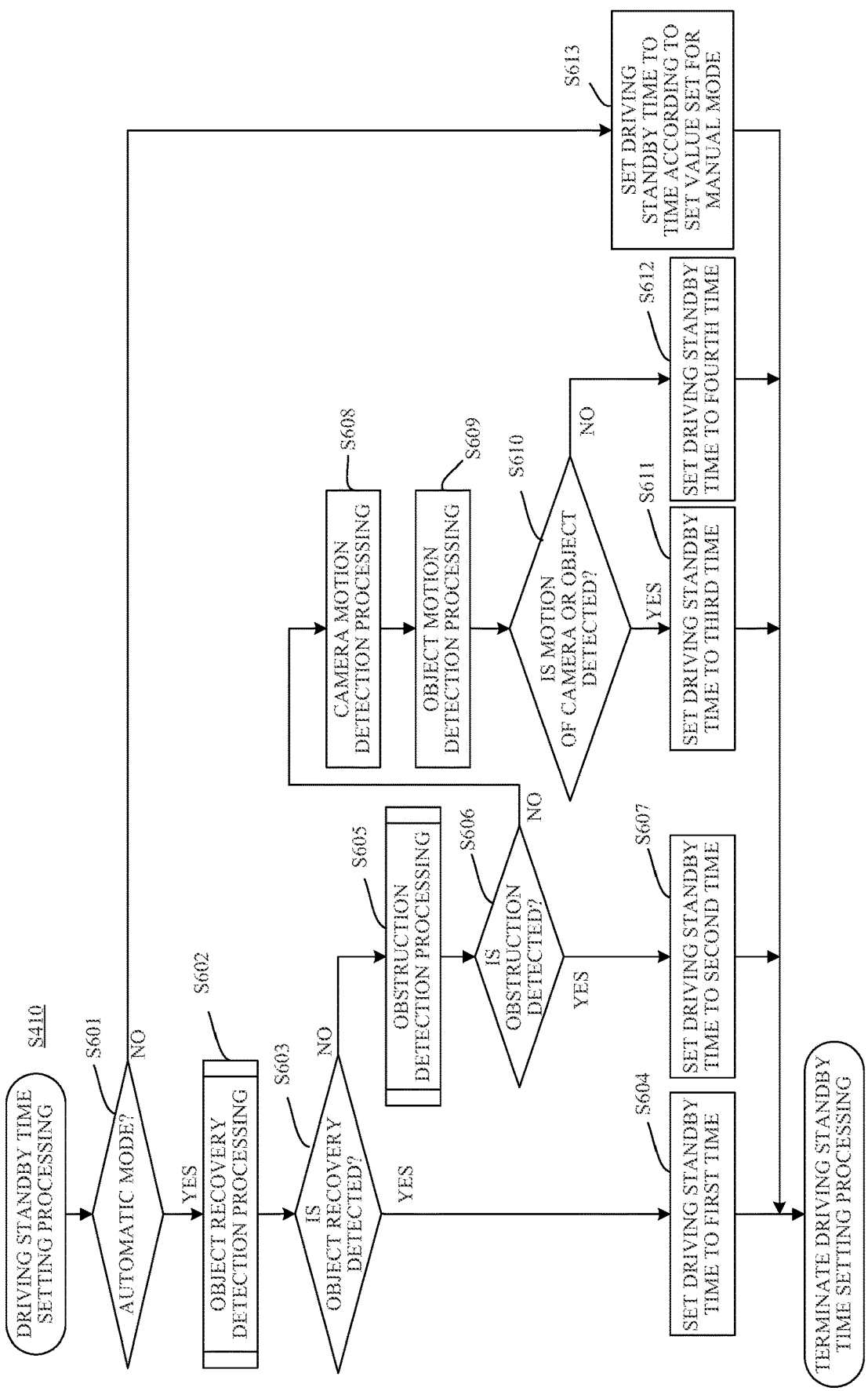
FIG. 6 is a flowchart illustrating driving standby time setting processing according to the first embodiment.

Next, referring to FIG. 6, a description will be given of the driving standby time setting processing (step S410) in this embodiment. FIG. 6 is a flowchart illustrating the driving standby time setting processing in this embodiment. Each step in FIG. 6 is mainly executed by the microcomputer 221 or the motion detector 122.

First, in step S601, the microcomputer 221 determines whether or not the set value (setting mode) is the automatic mode, the set value being set for the tracking operation by the user in the setter 102 (controlling unit). When the set value is the automatic mode, the process proceeds to step S602. On the other hand, when the set value is not the automatic mode, the process proceeds to step S613, and the microcomputer 221 sets, as the driving standby time, a predetermined value determined for each set value setting relating to the object tracking, the predetermined value being set for the manual mode.

Subsequently, in step S602, the microcomputer 221 performs object recovery detection processing. The object recovery detection processing is processing for detecting an object that is a previous tracking target, when the tracking target is mistakenly switched from one object to another object. The details of this processing will be described later. Subsequently, in step S603, the microcomputer 221 determines whether or not an object recovery is detected. When the object recovery is detected, the process proceeds to step S604, and the microcomputer 221 sets the driving standby time to a first time. The first time may be set relatively short so that it is possible to quickly restart the tracking operation on the object that is the previous tracking target. By setting the first time to 0, the tracking operation may be performed immediately.

On the other hand, when the object recovery is not detected in step S603, the process proceeds to step S605, and the microcomputer 221 performs obstruction detection processing. The obstruction detection processing is processing for detecting an unintended target for the user, such as an obstruction obstructing the object, on the screen or in the focus detection area. The details thereof will be described later. Subsequently, in step S606, the microcomputer 221 determines whether or not the obstruction is detected. When the obstruction is detected, the process proceeds to step S607, and the microcomputer 221 sets the driving standby time to a second time. The second time may be set relatively long so that it is possible to prevent the tracking target from being mistakenly switched to the obstruction when the obstruction obstructs the object. The second time may be set more optimally by making it longer as a size of obstruction increases.

On the other hand, when the obstruction is not detected in step S606, the process proceeds to step S608. In step S608, the motion detector 122 performs camera motion detection processing by using the motion detection result of the image pickup apparatus or the image pickup lens. Subsequently, in step S609, the microcomputer 221 performs object motion detection processing. Although details are omitted of the object motion detection processing, for example, a method can be used of calculating a motion vector of the object by the object detector 109 based on an output signal from a photometry sensor. The object motion detection processing is not limited to this method, and the motion of the object on the screen can be also detected based on a variation of the focus detection result.

Subsequently, in step S610, the microcomputer 221 determines whether or not the motion of the camera or the object is detected. When the motion is detected, the process proceeds to step S611, and the microcomputer 221 sets the driving standby time to a third time. The third time may be set relatively long so that it is possible to prevent a framing failure due to large motion of the camera and/or the object and to prevent tracking target from being accidentally switched to the background or an unintended object.

On the other hand, when the motion is not detected of the camera and the object in step S610, the process proceeds to step S612, and the microcomputer 221 sets the driving standby time to a fourth time. Here, since it is considered that the motion of the camera or object is small and that the framing failure is unlikely to occur, the fourth time may be set to a standard time so that it is possible to track the variation of the image plane position while the tracking target is prevented from being switched to the background or the unintended object.

[Object Recovery Detection Processing]

Figure 7A:
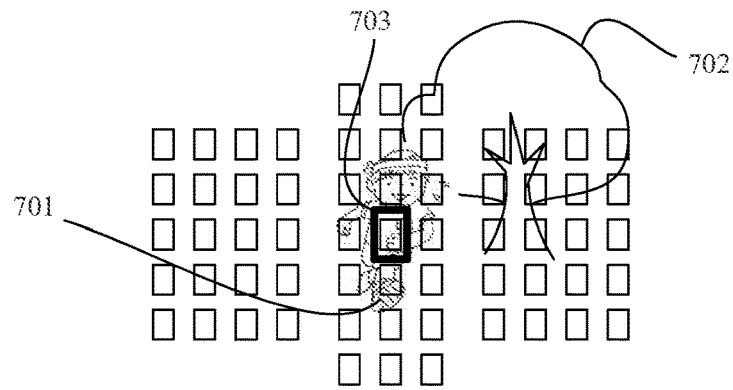
FIG. 7A to 7C are explanatory diagrams illustrating an outline of an object recovery according to the first embodiment.
Figure 7B:
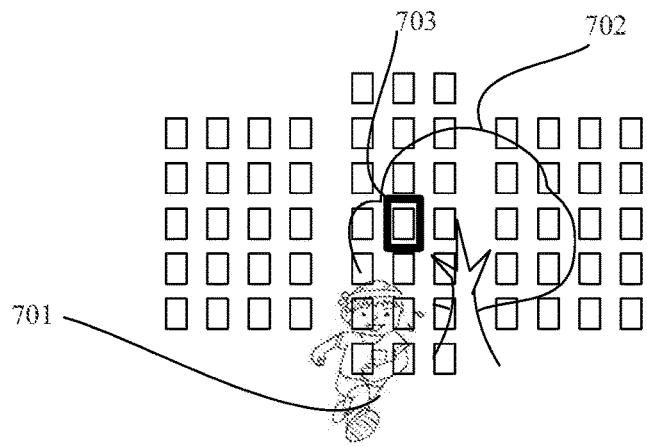
Figure 7C:
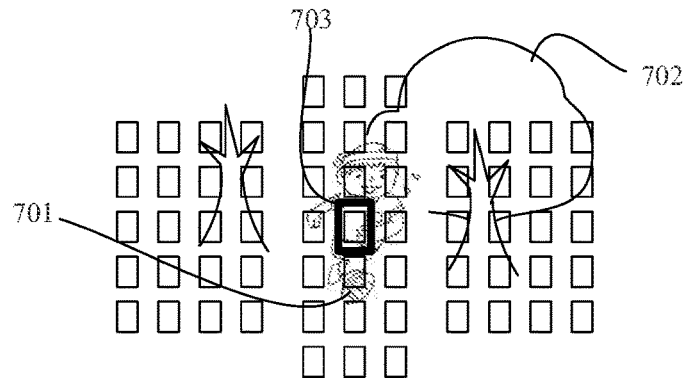

Next, a detailed description will be given of the object recovery detection processing in step S602 with reference to FIGS. 7A to 7C to FIG. 9. First, an outline will be described of the object recovery with reference to FIGS. 7A to 7C. FIGS. 7A to 7C are explanatory diagrams illustrating an outline of the object recovery. FIG. 7A illustrates a state where the focus detection area 703 includes an object A701 as a main object that is targeted by the user and the object A701 is tracked. However, the user may fail in framing, resulting in a state illustrated in FIG. 7B in which the focus detection area 703 includes an object B702 that is not the main object and is, for example, a background object. When the driving standby time elapses in this state, the lens is driven to the image plane position where the focus is detected with the object B702 as the tracking target, and the object A701 as the main object is out of focus. Thereafter, as illustrated in FIG. 7C, the user performs re-framing, and the focus detection area 703 includes the object A 701 as the main object again. This series of operations is called the object recovery.

However, even when the object recovery is performed, if the continuity determination determines that the continuity does not exist, the object A701 is not set as the tracking target and the lens is not driven to the image plane position on which the focus detection is performed, until the driving standby time elapses. Thus, until the driving standby time elapses, the object A701 is continuously out of focus and the user may miss an image pickup opportunity. In this embodiment, when the object recovery is detected, the driving standby time is set to relatively short in order to quickly restart the tracking operation to the previously targeted object.

Figure 8:
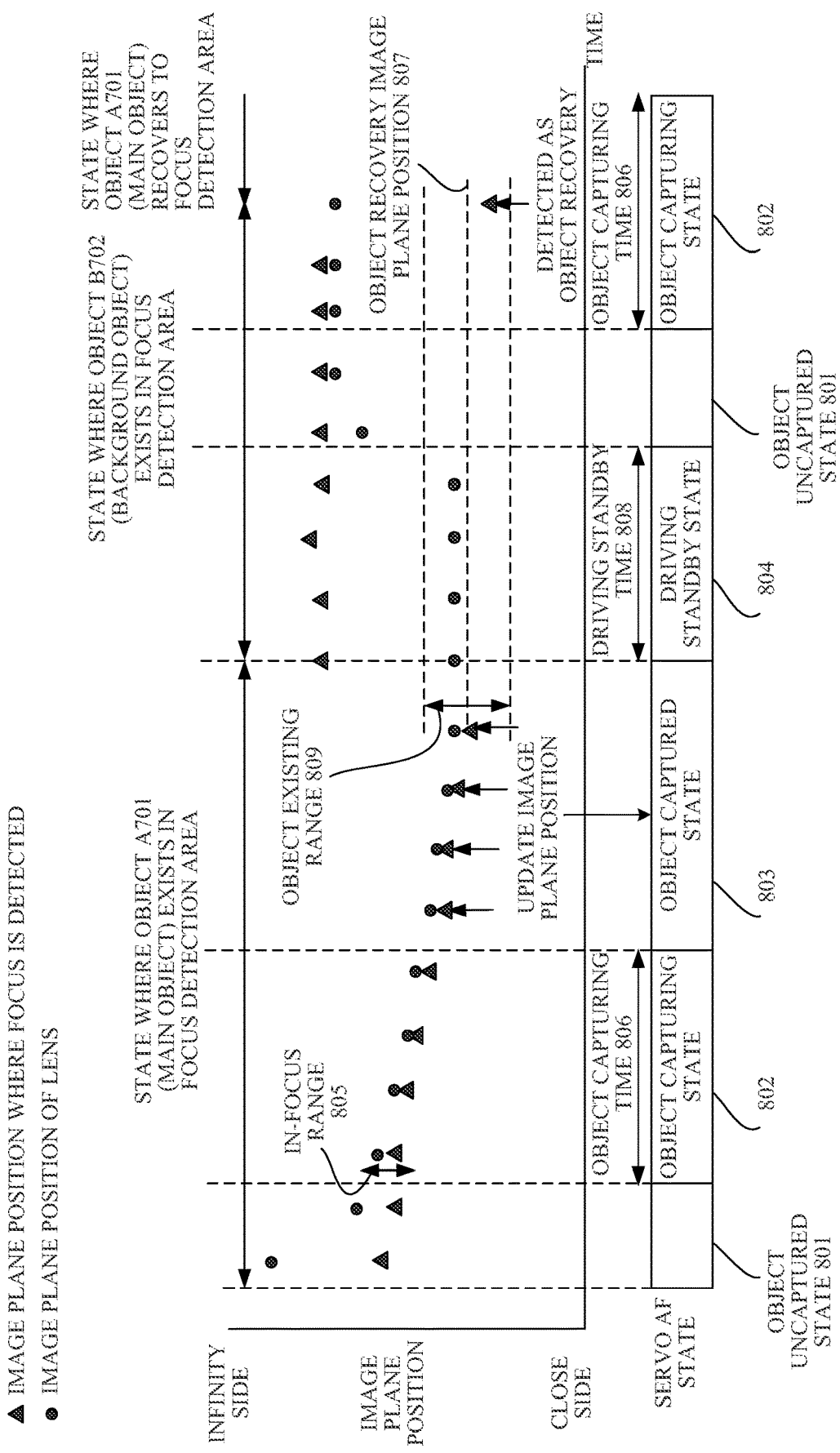
FIG. 8 is an explanatory diagram illustrating object recovery detection processing according to the first embodiment.
Figure 9:
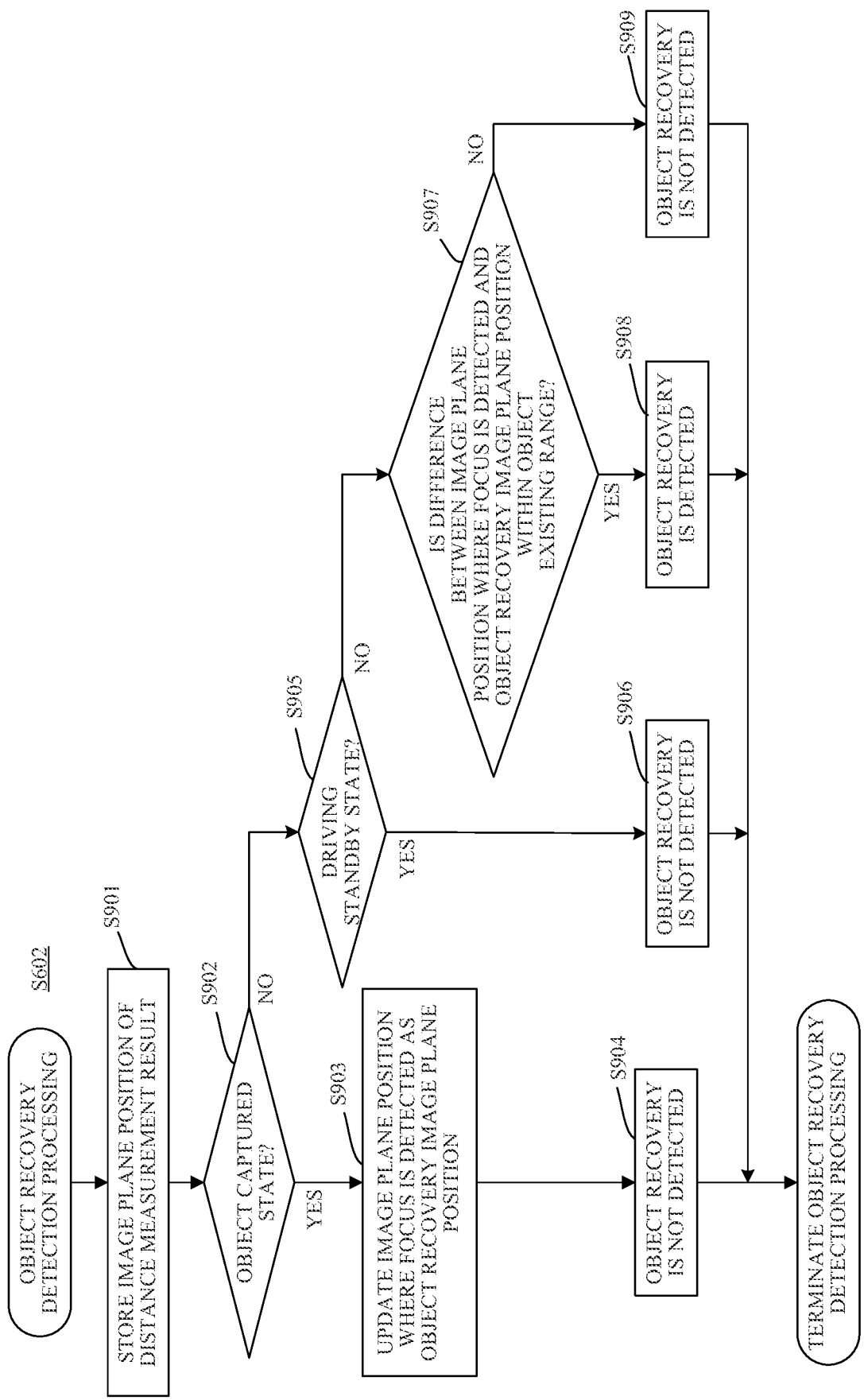
FIG. 9 is a flowchart illustrating the object recovery detection processing according to the first embodiment.

Next, a method will be described of the object recovery detection with reference to FIGS. 8 and 9. FIG. 8 is an explanatory diagram illustrating the object recovery detection processing. FIG. 9 is a flowchart illustrating the object recovery detection processing. Each step in FIG. 9 is mainly executed by the microcomputer 221.

First, in step S901, the microcomputer 221 stores the image plane position of a distance measurement result on the memory 108. Subsequently, in step S902, the microcomputer 221 determines whether or not the state is an object captured state. The object captured state is a state indicated by 803 in FIG. 8.

An object uncaptured state 801 is a state where the difference between the image plane position where the focus is detected and the image plane position of the lens is not within an in-focus range 805, that is, an out of focus state. Thereafter, the lens is driven to the image plane position where the focus is detected, and when the difference between the image plane position where the focus is detected and the image plane position of the lens gets within the in-focus range 805, that is, when an in-focus state is acquired, the state becomes an object capturing state 802. When the object capturing state 802 continues for more than an object capturing time 806, it is an object captured state 803. That is, the object captured state 803 is a state when the object is determined to be in a captured state after the object is in focus for a predetermined time or more. The object capturing time 806 may increase so as to improve an accuracy of the object captured state 803.

When the object captured state is determined in step 902, the process proceeds to step S903. In step S903, the microcomputer 221 updates the image plane position detected in step S901 as an object recovery image plane position 807. Subsequently, in step S904, the microcomputer 221 determines that the object recovery is not detected and terminates the object recovery detection processing. In the object captured state, since an object A901 is in a captured state, it is not determined as the object recovery.

On the other hand, when it is determined in step 902 that the state is not the object captured state, the process proceeds to step S905. In step S905, the microcomputer 221 determines whether or not the state is a driving standby state 804. The driving standby state 804 is a state in which the driving standby timer does not pass the driving standby time 808 in step S411 of FIG. 4 described above. When it is determined in step S905 that the state is in the driving standby state 804, the process proceeds to step S906. In step S906, the microcomputer 221 determines that the object recovery is not detected and terminates the object recovery detection processing.

On the other hand, when it is determined in step S905 that the state is not the driving standby state 804, the process proceeds to step S907. In step S907, the microcomputer 221 determines whether or not the difference between the image plane position where the focus is detected and the object recovery image plane position 807 is within an object existing range 809, in other words, within a predetermined range. At this time, the object recovery image plane position 807 is a latest focus detected image plane position updated during the object captured state 803. The object existing range 809 is a range of the image plane position in which an object A previously captured is likely to exist thereafter. The object existing range 809 may be expanded according to an elapsed time after updating the object recovery image plane position 807. When the object A701 is moving on the image plane position, the object existing range 809 may be asymmetric depending on a moving direction.

When it is determined in step S907 that the object is within the object existing range 809, the process proceeds to step S908. In step S908, the microcomputer 221 determines that object recovery is detected, and terminates the object recovery detection processing. On the other hand, when it is determined in step S907 that the object is not within the object existing range 809, the process proceeds to step S909. In step S909, the microcomputer 221 determines that the object recovery is not detected and terminates the object recovery detection processing.

In this embodiment, the object recovery may be determined by a variation in the object detected by the object detector 109. For example, by tracking the object A701, the object A701 may be determined to be recovered to the focus detection area. The determination may be made in combination with the method described in this embodiment.

[Obstruction Detection Processing]

Figure 10A:
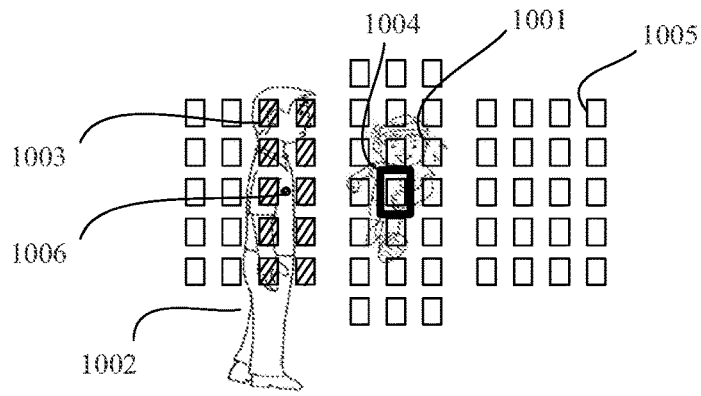
FIGS. 10A to 10C are explanatory diagrams illustrating an outline of an obstruction detection according to the first embodiment.
Figure 10B:
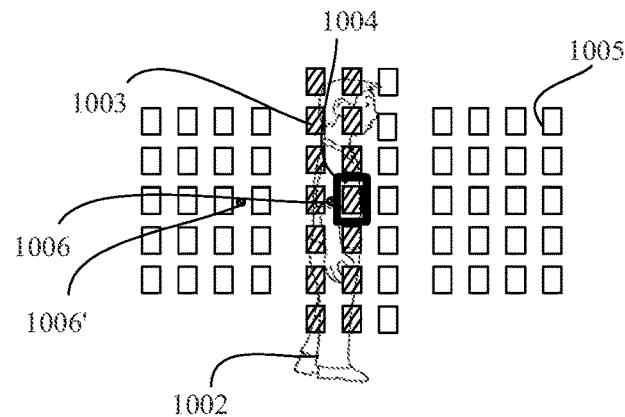
Figure 10C:
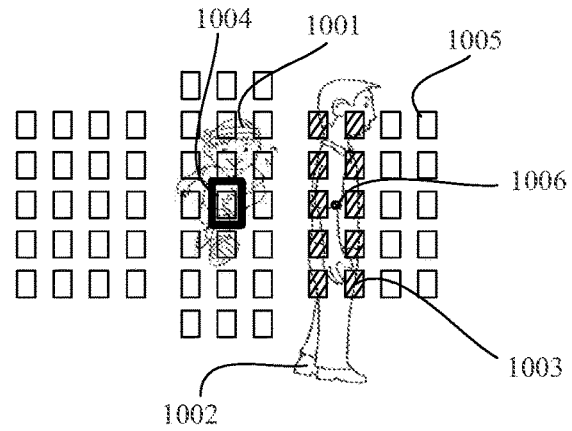

Next, details will be described of the obstruction detection processing in step S605 with reference to FIGS. 10A to 10C and FIGS. 11A and 11B. First, an outline will be described of an obstruction detection with reference to FIGS. 10A to 10C FIGS. 10A to 10C are explanatory diagrams illustrating an outline of the obstruction detection. FIG. 10A illustrates a state where a focus detection area 1004 includes an object A1001 as the main object targeted by the user and the object A1001 is tracked. However, as illustrated in FIG. 10B, the object A1001 may be obstructed by an object C1002 that is not the main object, and the focus detection area 1004 may include the object C1002 as an obstruction. When the driving standby time elapses in the state of FIG. 10B, the lens is driven to the image plane position where the focus is detected with the object C1002 as the tracking target.

Thereafter, as illustrated in FIG. 10C, an object C1002 as the obstruction passes in front of the object A1001, and the focus detection area 703 includes the object A701 as the main object again. After the driving standby time elapses, the object A1001 becomes the tracking target. However, when it is determined in the continuity determination that the continuity does not exist after the state becomes as illustrated in FIG. 10C, the object A701 is not set as the tracking target and the lens is not driven to the image plane position in which the focus is detected until the driving standby time elapses. Thus, until the driving standby time elapses, the object A701 is continuously out of focus and the image pickup opportunity may be missed.

In this embodiment, when the obstruction is detected, the driving standby time is set relatively long in order to prevent the tracking target of the tracking operation from being switched to another object from the object to be tracked.

Figure 11A:
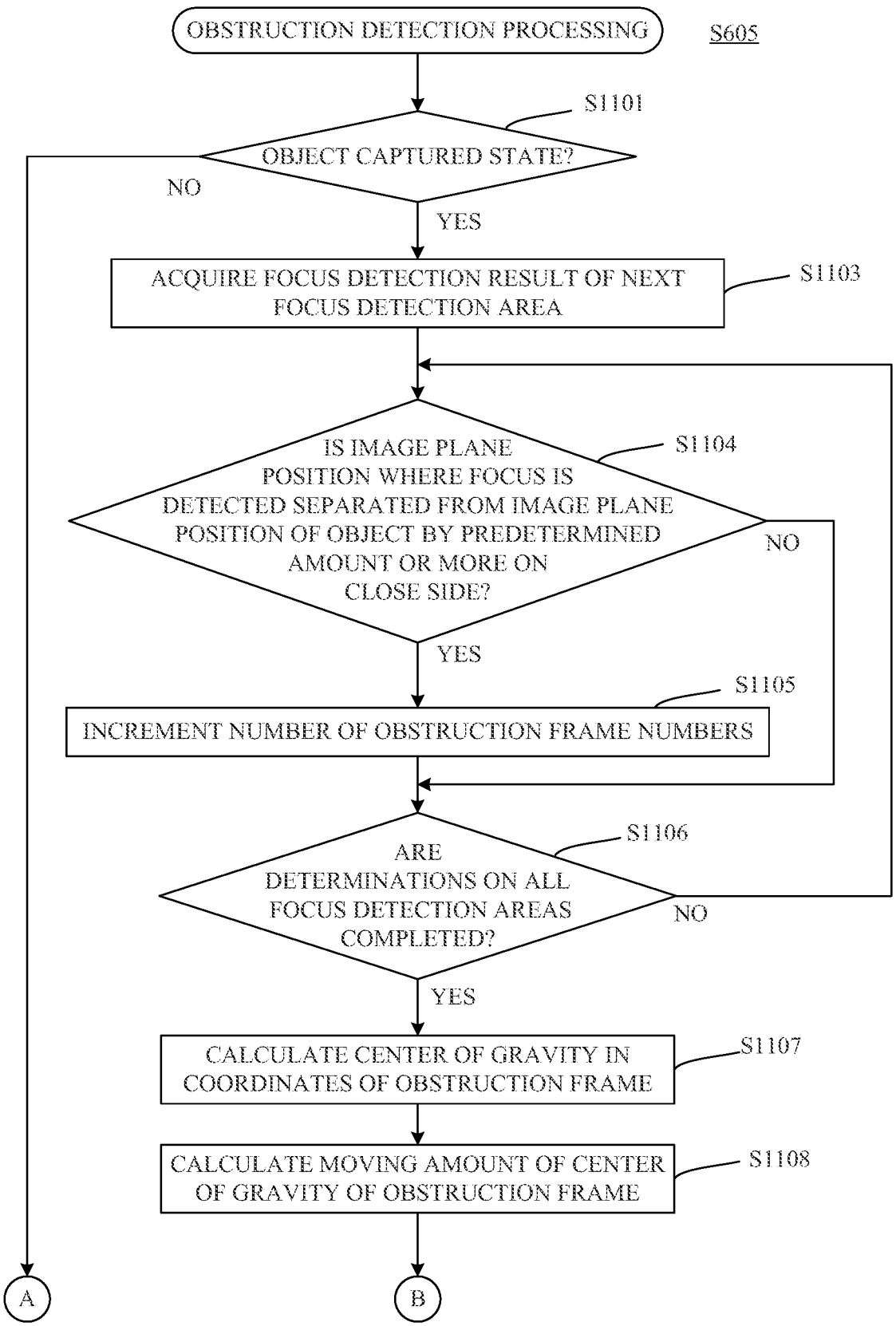
FIGS. 11A and 11B are flowcharts illustrating obstruction detection processing according to the first embodiment.
Figure 11B:
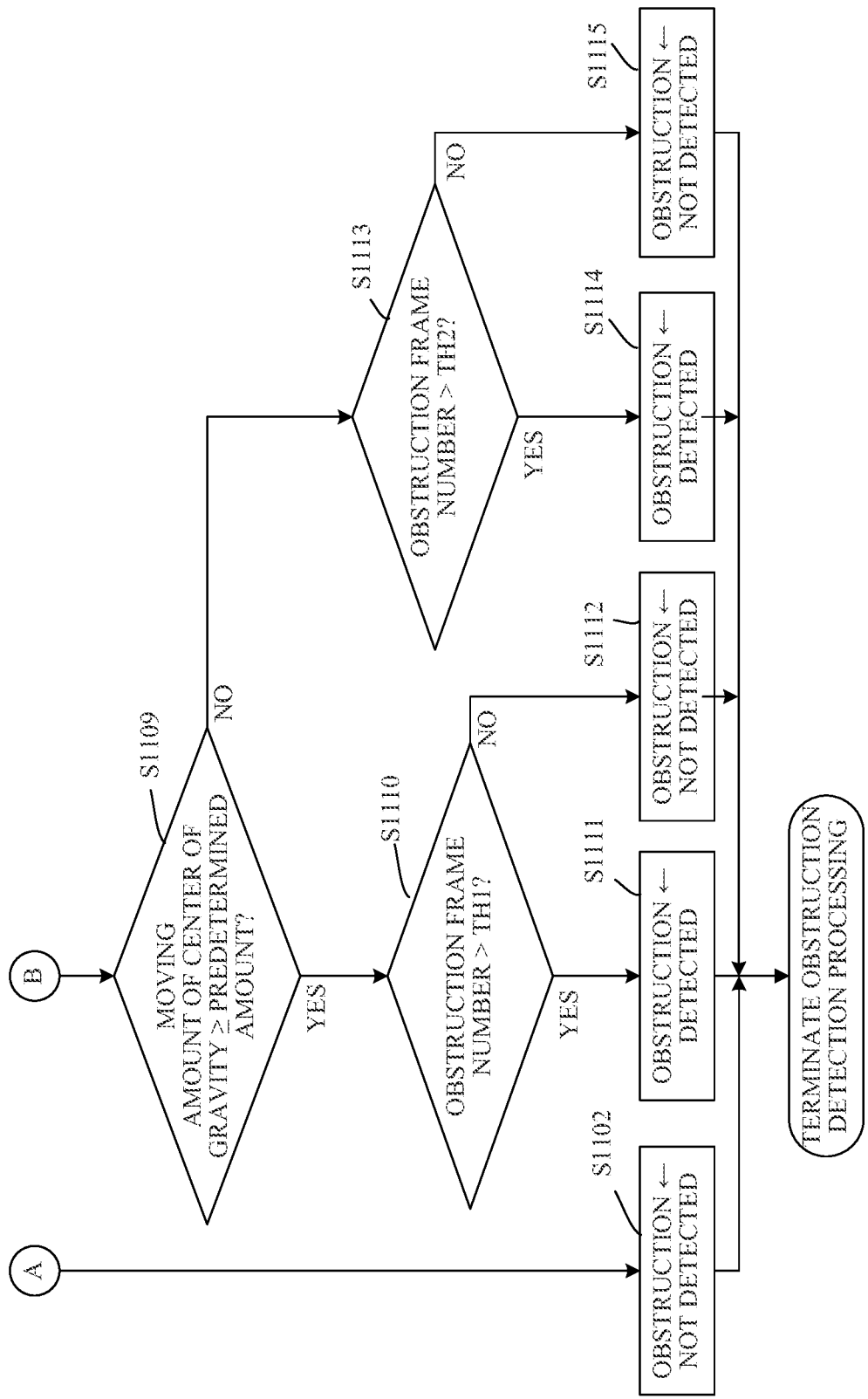

Next, the obstruction detection processing will be described with reference to FIGS. 11A and 11B. FIGS. 11A and 11B are flowcharts illustrating the obstruction detection processing. FIGS. 11A and 11B are mainly executed by the microcomputer 221.

First, in step S1101, the microcomputer 221 determines whether or not the state is the object captured state. The object captured state is the same as that used for the determination in step S902 in FIG. 9 described above. When it is determined in step S1101 that the state is not the object captured state, the process proceeds to step S1102, and the microcomputer 221 determines that the obstruction is not detected. This is because, when the object is not in the captured state, it is difficult to distinguish between the main object and the obstruction, the main object being targeted by the user to capture. On the other hand, when it is determined in step S1101 that the state is in the object captured state, the microcomputer 221 performs the processes of steps S1103 to S1106. In steps S103 to S106, the microcomputer 221 performs a determination for each ranging area of a plurality of focus detection areas, and repeats making the determination until each of determinations is completed for the focus detection results of all or some of the focus detection areas.

In step S1103, the microcomputer 221 acquires the focus detection result of a next focus detection area. Subsequently, in step S1104, the microcomputer 221 determines whether or not the image plane position where the focus is detected in step S1103 is separated from the image plane position of the object by a predetermined amount or more on the close side. When the difference between the image plane position where the focus is detected is separated from the image plane position of the object by the predetermined amount or more on the close side, the process proceeds to step S1105. In step S1105, the microcomputer 221 increments the number of obstruction frame numbers. On the other hand, when the image plane position where the focus is detected is not separated from the image plane position of the object by more than the predetermined amount on the close side in step S1104, the process skips step S1105 and proceeds to step S1106.

In step S1106, the microcomputer 221 determines whether or not the determinations on all the focus detection areas are completed. When the determinations on all the focus detection areas are completed, the process proceeds to step S1107. On the other hand, when the determinations on all the focus detection areas are not completed, the process returns to step 1103.

In step S1107, the microcomputer 221 calculates a center of gravity in coordinates of an obstruction frame. For example, in the case of FIG. 10A, the obstruction frame is represented by shaded areas in the focus detection area, the shaded area being determined to be separated by a predetermined amount or more in the close side in step S1104. In FIG. 10A, an obstruction frame number is 10, and the center of gravity corresponds to the point 1006. Subsequently, in step S1108, the microcomputer 221 calculates a moving amount of the center of gravity in the coordinates of the obstruction frame. An obstruction moving amount corresponds to a difference between points 1006 and 1006' in the case of FIG. 10B.

Subsequently, in step S1109, the microcomputer 221 determines whether or not the moving amount of center of gravity is equal to or larger than a predetermined amount. When the moving amount of the center of gravity is equal to or larger than the predetermined amount, the process proceeds to step S1110. In step S110, the microcomputer 221 determines whether or not the obstruction frame number is larger than a predetermined value TH1. When it is determined in step S1110 that the obstruction frame number is larger than the predetermined value TH1, the process proceeds to step S1111. In step S111, the microcomputer 221 terminates the obstruction detection processing, determining that the obstruction is detected. On the other hand, when it is determined in step S1110 that the obstruction frame number is less than or equal to the predetermined value TH1, the process proceeds to step S1112. In step S1112, the microcomputer 221 terminates the obstruction detection processing, determining that the obstruction is not detected.

On the other hand, when it is determined in step S1109 that the moving amount of the center of gravity is not equal to or larger than the predetermined amount, the process proceeds to step S1113. In step S1113, the microcomputer 221 determines whether or not the obstruction frame number is larger than a predetermined value TH2. When it is determined in step S1113 that the obstruction frame number is larger than the predetermined value TH2, the process proceeds to step S1114. In step S1114, the microcomputer 221 terminates the obstruction detection processing, determining that the obstruction is detected. On the other hand, when it is determined in step S1113 that the obstruction frame number is less than or equal to the predetermined value TH2, the process proceeds to step 1115. In step S1115, the microcomputer 221 terminates the obstruction detection processing, determining that the obstruction is not detected.

The predetermined value TH1 and the predetermined value TH2 have a relationship of TH1<TH2. When the moving amount of the center of gravity is equal to or larger than the predetermined value, it is likely that the obstruction is moving, and the obstruction may obstruct the main object. Thus, by reducing the threshold of the number of frames that are determined to be obstructions, the obstruction is easily detected.

The specific method of the obstruction detection in this embodiment has been described above, but the present invention is not limited to this, and the object detector 109 may determine the obstruction detection. For example, it is possible to determine an object other than the object A1001 as an obstruction, the object being detected as a person, animal or any other object detected by a known object detection method. The determination may be made in combination with the method of this embodiment.

This embodiment detects the characteristics of the main object and of the surroundings of the main object and sets the driving standby time suitable for the characteristics.

Thereby, this embodiment can prevent the tracking target from being switched to the background or an unintended object while tracking the variation in the image plane position of the main object.

Second Embodiment

Next, a second embodiment of the present invention will be described. Since the basic configurations in this embodiment are the same as those in the first embodiment, only part different from the first embodiment will be described.

[Image Plane Position Continuity Determination Processing]

Figure 12A:
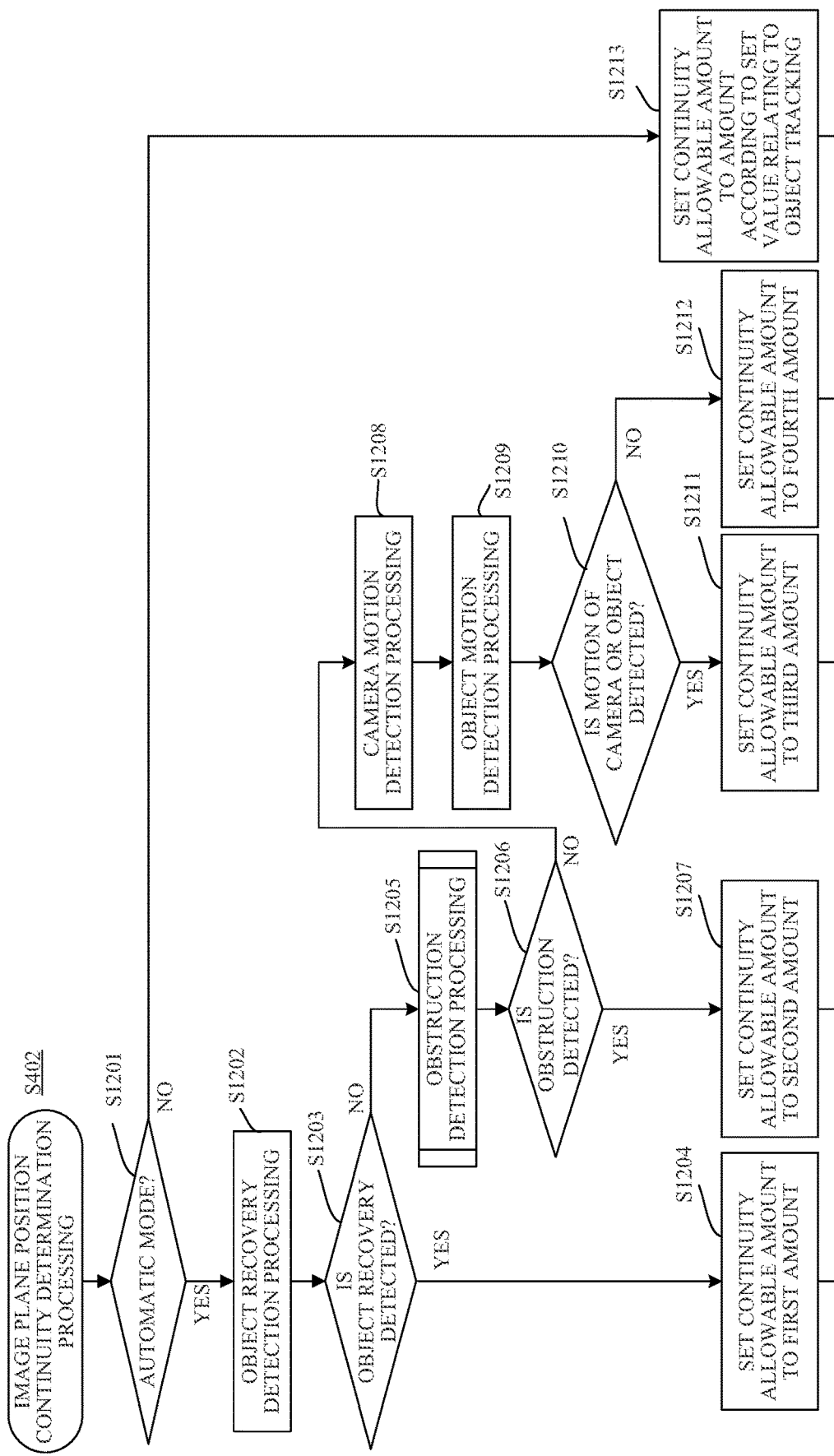
FIGS. 12A and 12B are flowcharts illustrating image plane position continuity determination processing according to a second embodiment.
Figure 12B:
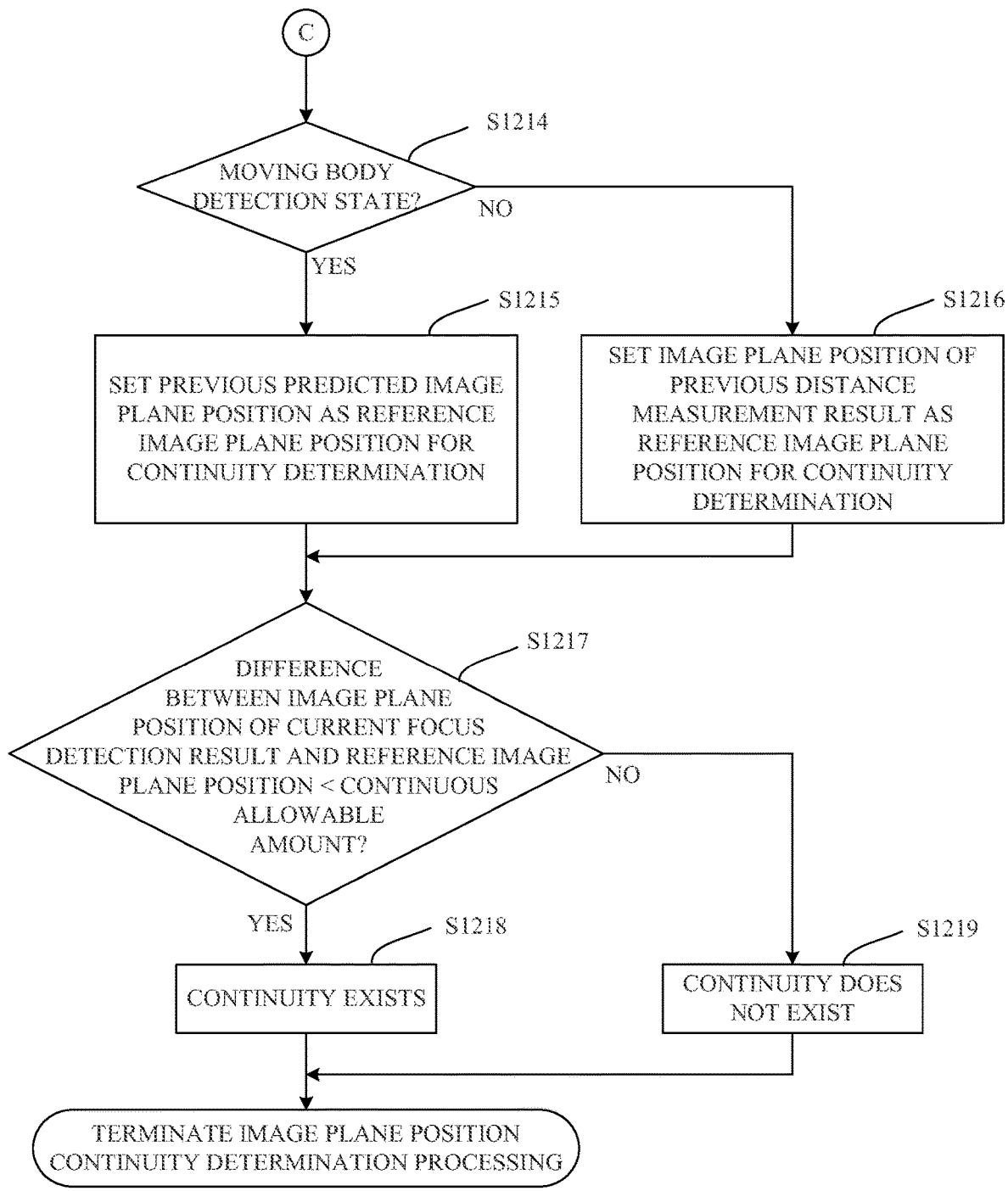

A detailed description will be given of image plane position continuity determination processing in step S402 in this embodiment with reference to FIGS. 12A and 12B. FIGS. 12A and 12B are flowcharts illustrating the image plane position continuity determination processing. Each step in FIGS. 12A and 12B is mainly executed by the microcomputer 221 or the motion detector 122.

First, in step S1201, the microcomputer 221 determines whether or not the set value set by the user in the setter (controlling unit) 102 for the tracking operation is the automatic mode. When the set value is the automatic mode, the process proceeds to step S1202. On the other hand, when the set value is not the automatic mode, the process proceeds to step S1213, and the microcomputer 221 sets, as a continuity allowable amount, a predetermined value determined for each set value setting relating to the object tracking, the predetermined value being set in the manual mode.

In step S1202, the microcomputer 221 performs the above-described object recovery detection processing. Subsequently, in step S1203, the microcomputer 221 determines whether or not the object recovery is detected. When the object recovery is detected, the process proceeds to step S1204, and the microcomputer 221 sets the continuity allowable amount to a first amount. The first amount may be set relatively large so that it is possible to quickly restart the tracking operation on the object that is the previous tracking target. When the continuous allowable amount is set to infinity, it is possible to immediately perform the tracking operation.

On the other hand, when object recovery is not detected in step S1203, the process proceeds to step S1205, and the microcomputer 221 performs the above-described obstruction detection processing. Subsequently, in step S1206, the microcomputer 221 determines whether or not an obstruction is detected. When the obstruction is detected, the process proceeds to step S1207, and the microcomputer 221 sets the continuity allowable amount to a second amount. The second amount may be set relatively small so that it is possible to prevent the tracking target from being mistakenly switched to the obstruction when the obstruction obstructs the object. For more proper setting, the second amount may be set larger as the difference increases between the obstruction and the image plane position of the object.

On the other hand, when the obstruction is not detected in step S1206, the process proceeds to step S1208. In step S208, the motion detector 122 performs camera motion detection processing by using the motion detection result of the image pickup apparatus or the image pickup lens. Subsequently, in step S1209, the microcomputer 221 performs object motion detection processing. Subsequently, in step S1210, the microcomputer 221 determines whether or not the motion of the camera or the object is detected. When the motion is detected, the process proceeds to step S1211, and the microcomputer 221 sets the continuity allowable amount to a third amount. The third amount may be set relatively long so that it is possible to prevent erroneous failing in framing and the tracking target from being switched to the background or an unintended object when the camera and the object have large motion.

On the other hand, when the motion of the camera and the object is not detected in step S1210, the process proceeds to step S1212, and the microcomputer 221 sets the continuity allowable amount to a fourth amount. Here, it is considered that the motion of the camera and the object is small and the framing is unlikely to fail. Thus, the fourth amount may be set to a standard amount so that it is possible to track the variation in the image plane position and to prevent the tracking target from being switched to the background or unintended object.

Subsequently, in step S1214, the microcomputer 221 determines whether or not the state is in a moving body detection state. When it is determined that the moving body is detected, the process proceeds to step S1215. In step S1215, the microcomputer 221 sets a previous predicted image plane position as a reference image plane position for the continuity determination. On the other hand, when it is determined in step S1214 that the moving object is not detected, the process proceeds to step S1216. In step S1216, the microcomputer 221 sets the image plane position of the previous distance measurement result as the reference image plane position for continuity determination.

Subsequently, in step S1217, the microcomputer 221 determines whether or not the difference between the image plane position of the current focus detection result and the reference image plane position is smaller than the continuous allowable amount. When the difference between the image plane position of the current focus detection result and the reference image plane position is smaller than the continuous allowable amount, the process proceeds to step S1218, and the microcomputer 221 determines that a continuity exists. On the other hand, when the difference between the image plane position of the current focus detection result and the reference image plane position is equal to or more than the continuous allowable amount in step S1217, the process proceeds to step S1219, and the microcomputer 221 determines that the continuity does not exist.

This embodiment detects the characteristics of the main object and of the surroundings of the main object and sets the continuity allowable amount suitable for the characteristic. Thereby, this embodiment can prevent the tracking target from being switched to the background or an unintended object while tracking the variation in the image plane position of the main object.

As described above, in each embodiment, a control apparatus (focus adjustment apparatus 100) includes a focus detecting unit (focus detector 101), a continuity determining unit (continuity determiner 121), a characteristic detecting unit, a controlling unit (controller 124), and a focus adjusting unit (focus adjuster 103). The focus detecting unit is configured to detect a defocus amount. The continuity determining unit is configured to determine a continuity of the focus detection result. The characteristic detecting unit is configured to detect characteristics of a main object and of surroundings of the main object. The controlling unit is configured to change a parameter relating to a tracking operation during a tracking operation based on its characteristic. The focus adjusting unit is configured to perform a focus adjustment based on the defocus amount, a continuity of focus detection result and a parameter.

The control apparatus may include a motion detecting unit (motion detector 122 or object detector 109) configured to detect motion of an image pickup apparatus or the main object. The controlling unit is configured to change the parameter based on the detection result of the motion detecting unit when the characteristic is not detected by the characteristic detecting unit.

The characteristic detecting unit may be a recovered object detecting unit (recovered object detector 125) configured to detect that the main object recovers to a position detectable by the focus detecting unit. The recovered object detecting unit may determine that the main object is recovers, when the focus detection result within a predetermined range, that is, within a recovery allowable range, is detected from a past focus detection result relating to the main object. The control apparatus may include a memory unit (memory 108) configured to store the past focus detection result relating to the main object. The recovered object detecting unit is configured to change a predetermined range based on an elapsed time after the memory unit stores the past focus detection result relating to the main object. The recovered object detecting unit may change the predetermined range based on the current prediction result of the main object calculated based on the past focus detection result regarding the main object. The recovered object detecting unit may track the main object in the past and may detect that the position of the main object enters the focus detection area.

The characteristic detecting unit may be an obstruction detecting unit (obstruction detector 126) configured to detect an obstruction existing around the main object. The obstruction detecting unit may perform the focus detection in a plurality of focus detection areas, and may determine that the obstruction is detected when the number of focus detection areas closer than the image plane position of the main object by a predetermined amount or more is larger than a predetermined threshold (obstruction determination threshold). The obstruction detecting unit may provide a change so as to reduce the predetermined threshold when the obstruction is moving.

When the continuity determining unit determines that the continuity does not exist, the parameter may be a driving standby time for inhibiting the focus adjustment performed by the focus adjusting unit based on the defocus amount. The controlling unit may provide a change so as to shorten the driving standby time when the recovery of the main object is detected by the recovered object detecting unit. The controlling unit may provide a change so as to lengthen the driving standby time when an obstruction is detected by the obstruction detecting unit.

The parameter may be continuity allowable amount used by the continuity determining unit for determining the continuity of the focus detection result. The controlling unit may provide a change so as to increase the continuity allowable amount when the recovery of the main object is detected by the recovered object detecting unit. The controlling unit may provide a change so as to reduce the continuity allowable amount when an obstruction is detected by the obstruction detecting unit.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$M, a flash memory device, a memory card, and the like.

According to each embodiment, it is possible to provide a control apparatus, an image pickup apparatus, a control method, and a memory medium each of which can properly keep tracking an object during a tracking operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-193630, filed on Oct. 24, 2019 which is hereby incorporated by reference herein in its entirety.

What is claimed is:

1. A control apparatus comprising:
    a focus detecting unit configured to detect a defocus amount;
    a continuity determining unit configured to determine a continuity of a focus detection result;
    a characteristic detecting unit configured to detect characteristics of a main object and of surroundings of the main object;
    a controlling unit configured to change a parameter relating to a tracking operation based on the characteristics during the tracking operation; and
    a focus adjusting unit configured to perform a focus adjustment based on the defocus amount, the continuity of the focus detection result and the parameter,
    wherein at least one processor or circuit is configured to perform a function of at least one of the units.

2. The control apparatus according to claim 1, further comprising:
    a motion detecting unit configured to detect motion of an image pickup apparatus or of the main object,
    wherein when the characteristic detecting unit does not detect the characteristics, the controlling unit changes the parameter based on a detection result of the motion detecting unit.

3. The control apparatus according to claim 1,
    wherein the characteristic detecting unit is a recovered object detecting unit configured to detect that the main object recovers to a position detectable for the focus detecting unit.

4. The control apparatus according to claim 3,
    wherein when a focus detection result within a predetermined range is detected from a past focus detection result relating to the main object, the recovered object detecting unit determines that the main object is recovered.

5. The control apparatus according to claim 4, further comprising
    a memory unit configured to store the past focus detection result relating to the main object,
    wherein the recovered object detecting unit changes the predetermined range based on an elapsed time after the memory unit stores the past focus detection result relating to the main object.

6. The control apparatus according to claim 4,
    wherein the recovered object detecting unit changes the predetermined range based on a current prediction result for the main object calculated based on the past focus detection result relating to the main object.

7. The control apparatus according to claim 3,
    wherein the recovered object detecting unit tracks a past main object and detects that a position of the main object enters a focus detection area.

8. The control apparatus according to claim 1,
    wherein the characteristic detecting unit is an obstruction detecting unit for detecting an obstruction existing around the main object.

9. The control apparatus according to claim 8,
    wherein the obstruction detecting unit performs a focus detection in a plurality of focus detection areas, and determines that the obstruction is detected when the number of focus detection areas on more close side than an image plane position of the main object by a predetermined amount or more is larger than the predetermined threshold.

10. The control apparatus according to claim 9,
    wherein when the obstruction is moving, the obstruction detecting unit provides a change so as to reduce the predetermined threshold.

11. The control apparatus according to claim 1,
    wherein when the continuity determining unit determines that the continuity does not exist, the parameter is a driving standby time for inhibiting the focus adjustment performed by the focus adjusting unit based on the defocus amount.

12. The control apparatus according to claim 11,
    wherein when the recovered object detecting unit detects a recovery of the main object, the controlling unit provides a change so as to shorten the driving standby time.

13. The control apparatus according to claim 11,
    wherein when the obstruction detecting unit detects an obstruction, the controlling unit provides a change so as to lengthen the driving standby time.

14. The control apparatus according to claim 1,
    wherein the parameter is a continuity allowable amount used by the continuity determining unit for determining the continuity of the focus detection result.

15. The control apparatus according to claim 14,
    wherein when the recovered object detecting unit detects a recovery of the main object, the controlling unit provides a change so as to increase the continuity allowable amount.

16. The control apparatus according to claim 14,
wherein when the obstruction detecting unit detects an obstruction, the controlling unit provides a change so as to reduce the continuity allowable amount.

17. An image pickup apparatus comprising:
an image sensor configured to photoelectrically convert an optical image formed via an image pickup optical system; and
a control apparatus,
wherein the control apparatus includes:
- a focus detecting unit configured to detect a defocus amount;
- a continuity determining unit configured to determine a continuity of a focus detection result;
- a characteristic detecting unit configured to detect characteristics of a main object and of surroundings of the main object;
- a controlling unit configured to change a parameter relating to a tracking operation based on the characteristics during the tracking operation; and
- a focus adjusting unit configured to perform a focus adjustment based on the defocus amount, the continuity of the focus detection result and the parameter, and wherein at least one processor or circuit is configured to perform a function of at least one of the units.

18. A control method comprising following steps of:
detecting a defocus amount;
determining a continuity of a focus detection result;
detecting characteristics of a main object and of surroundings of the main object;
changing a parameter relating to a tracking operation based on the characteristics during the tracking operation; and
performing a focus adjustment based on the defocus amount, the continuity of the focus detection result and the parameter.

19. A non-transitory computer-readable storage medium storing a computer program that causes a computer to execute a control method according to claim 18.

* * * * *